(12) United States Patent  (10) Patent No.: US 8,151,821 B2
Ball  (45) Date of Patent: Apr. 10, 2012

(54) FAUCET MOUNTING SLEEVE

(75) Inventor: William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 906 days.

(21) Appl. No.: 12/115,223

(22) Filed: May 5, 2008

(65) Prior Publication Data

US 2009/0007971 A1  Jan. 8, 2009

Related U.S. Application Data

(60) Provisional application No. 60/947,902, filed on Jul. 3, 2007.

(51) Int. Cl.
*F16L 5/00* (2006.01)
*F16L 3/10* (2006.01)
*F17D 3/00* (2006.01)
*F16M 13/02* (2006.01)

(52) U.S. Cl. .......... 137/359; 137/360; 137/556; 248/70; 248/73; 248/542

(58) Field of Classification Search .............. 137/360, 137/359, 358, 357, 356, 377; 248/73, 74.1, 248/540, 541, 230.1, 673, 674, 676–678
See application file for complete search history.

(56) References Cited

U.S. PATENT DOCUMENTS

| 181,133 | A | | 8/1876 | Berger | |
| 352,805 | A | | 11/1886 | Carr | |
| 425,852 | A | | 4/1890 | Berger | |
| 1,278,895 | A | * | 9/1918 | Farley | 126/315 |
| 1,556,241 | A | * | 10/1925 | Mueller | 285/193 |
| 1,816,443 | A | * | 7/1931 | Shaw | 248/70 |
| 2,053,262 | A | * | 9/1936 | Cornell, Jr. | 248/65 |
| 3,105,707 | A | * | 10/1963 | Jacobson | 285/39 |
| D239,448 | S | | 4/1976 | Kazienko et al. | |
| 4,186,761 | A | * | 2/1980 | Guarnieri | 137/315.15 |
| 4,206,779 | A | * | 6/1980 | Sandstrom | 137/360 |
| 4,366,866 | A | * | 1/1983 | Sweeney | 169/37 |
| D270,090 | S | | 8/1983 | Jennings | |
| 4,473,244 | A | * | 9/1984 | Hill | 285/14 |
| 4,490,954 | A | * | 1/1985 | Cresti | 52/220.8 |

(Continued)

FOREIGN PATENT DOCUMENTS

JP  2005-54387  3/2005

OTHER PUBLICATIONS

"Hose Bib Supporter", PerfectSett Product Sheet, 2006, p. 1.

(Continued)

*Primary Examiner* — John Rivell
*Assistant Examiner* — Jonathan Waddy
(74) *Attorney, Agent, or Firm* — Sheridan Ross P.C.

(57) ABSTRACT

A system for mounting a faucet to the exterior portion of a dwelling is provided. A mounting sleeve is employed that is associated with a tube that is interconnected to the faucet that is generally positioned outside of a dwelling. The tube is rigidly interconnected to a mounting sleeve that is supported by at least one bracket that allows for selective adjustments. That is, the mounting sleeve may be selectively offset from the interior surface of the dwelling, thereby accommodating exterior building surfaces with irregular shapes such as stone, brick, mortar, stucco, etc. The mounting system provides additional rigidity to the faucet/dwelling interconnection.

21 Claims, 26 Drawing Sheets

U.S. PATENT DOCUMENTS

| | | | | |
|---|---|---|---|---|
| 4,848,395 | A * | 7/1989 | Krippendorf | 137/359 |
| 4,863,201 | A | 9/1989 | Carstens | |
| 4,989,278 | A * | 2/1991 | Kostorz | 4/676 |
| 5,033,777 | A | 7/1991 | Blenkush | |
| 5,050,632 | A | 9/1991 | Means, Jr. | |
| 5,316,041 | A | 5/1994 | Ramacier et al. | |
| 5,381,826 | A * | 1/1995 | Franz | 137/557 |
| 5,390,876 | A * | 2/1995 | Hatano et al. | 248/73 |
| 5,535,776 | A | 7/1996 | Kingman | |
| 5,547,152 | A * | 8/1996 | Krock | 248/74.1 |
| 5,577,530 | A | 11/1996 | Condon | |
| 5,582,199 | A * | 12/1996 | Schmidt et al. | 137/360 |
| 5,803,508 | A * | 9/1998 | Lowella | 285/64 |
| D408,895 | S | 4/1999 | Lai | |
| 5,906,401 | A | 5/1999 | Viegener | |
| 5,996,295 | A | 12/1999 | Merkle | |
| 6,065,491 | A * | 5/2000 | Rider | 137/360 |
| 6,142,172 | A | 11/2000 | Shuler et al. | |
| 6,195,818 | B1 | 3/2001 | Rodstein et al. | |
| D450,814 | S | 11/2001 | Aldred et al. | |
| 6,360,770 | B1 | 3/2002 | Buchner et al. | |
| 6,389,756 | B1 * | 5/2002 | Oberdorfer | 52/34 |
| 6,394,125 | B2 * | 5/2002 | White | 137/312 |
| 6,431,204 | B1 | 8/2002 | Ball | |
| 6,578,800 | B2 * | 6/2003 | Stefan | 248/52 |
| D477,385 | S | 7/2003 | Hampton | |
| D478,652 | S | 8/2003 | Lai | |
| 6,717,055 | B2 * | 4/2004 | Kato | 174/72 A |
| D510,131 | S | 9/2005 | Karasawa | |
| 6,948,518 | B1 * | 9/2005 | Ball | 137/359 |
| 7,040,670 | B2 | 5/2006 | Madden | |
| 7,055,863 | B1 * | 6/2006 | Commeville et al. | 285/46 |
| D586,880 | S | 2/2009 | Gaston et al. | |
| D612,021 | S | 3/2010 | Schmidt | |
| D622,348 | S | 8/2010 | Gaston et al. | |
| D637,696 | S | 5/2011 | Ball et al. | |
| 2004/0035064 | A1 | 2/2004 | Kugler et al. | |
| 2005/0138726 | A1 * | 6/2005 | Daly | 4/695 |
| 2007/0157981 | A1 | 7/2007 | Burns et al. | |
| 2009/0211021 | A1 | 8/2009 | Gabriele | |
| 2010/0116359 | A1 | 5/2010 | Ball et al. | |
| 2010/0180375 | A1 | 7/2010 | Meehan et al. | |

OTHER PUBLICATIONS

Examiner's Report for Canadian Patent Application No. 132120, dated Jan. 6, 2010.
Advertisement entitled, "In Box™ for New Brick Weatherproof in Use Box with Protective Adapter Sleeve," Arlington Industries, Inc., 2006, 1 page.
Official Action for Canadian Patent Application No. 2,636,578, dated Sep. 24, 2010.
Offical Action for Canadian Patent Application No. 136095, dated Aug. 20, 2010.
Office Action for U.S. Appl. No. 29/352,946, mailed Sep. 29, 2010.
Notice of Allowability for U.S. Appl. No. 29/352,946, mailed Nov. 10, 2010.
Official Action for U.S. Appl. No. 29/352,949, mailed Sep. 29, 2010.
Notice of Allowance for U.S. Appl. No. 29/352,949, mailed Oct. 25, 2010.
Notice of Allowance for U.S. Appl. No. 29/352,945, mailed Oct. 25, 2010.
Official Action for U.S. Appl. No. 29/352,948, mailed Sep. 29, 2010.
Notice of Allowance for U.S. Appl. No. 29/352,948, mailed Oct. 27, 2010.
Official Action for Canadian Patent Application No. 2,636,578, dated May 6, 2011.
Notice of Allowance for U.S. Design Application No. 29/333,698, mailed Mar. 17, 2011.
Notice of Allowance for U.S. Patent Application No. 29/383,460, mailed Feb. 10, 2011.
Official Action for U.S. Appl. No. 12/649,103, mailed Oct. 27, 2011 17 pages.

* cited by examiner

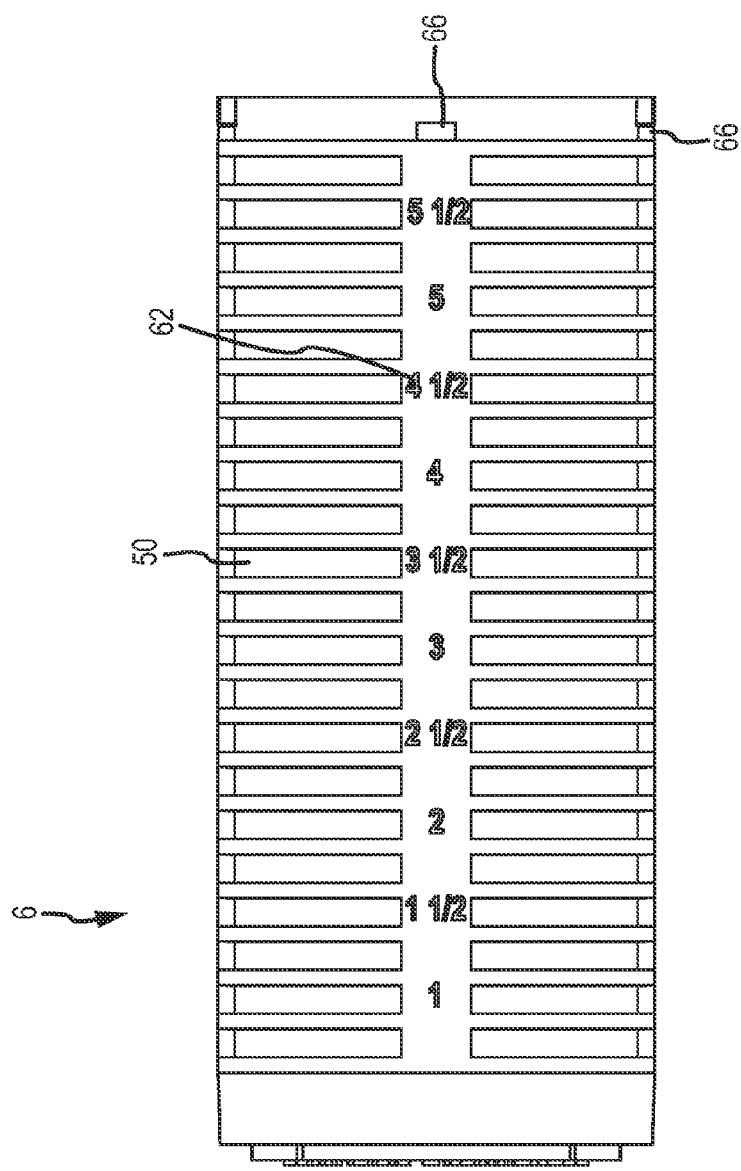

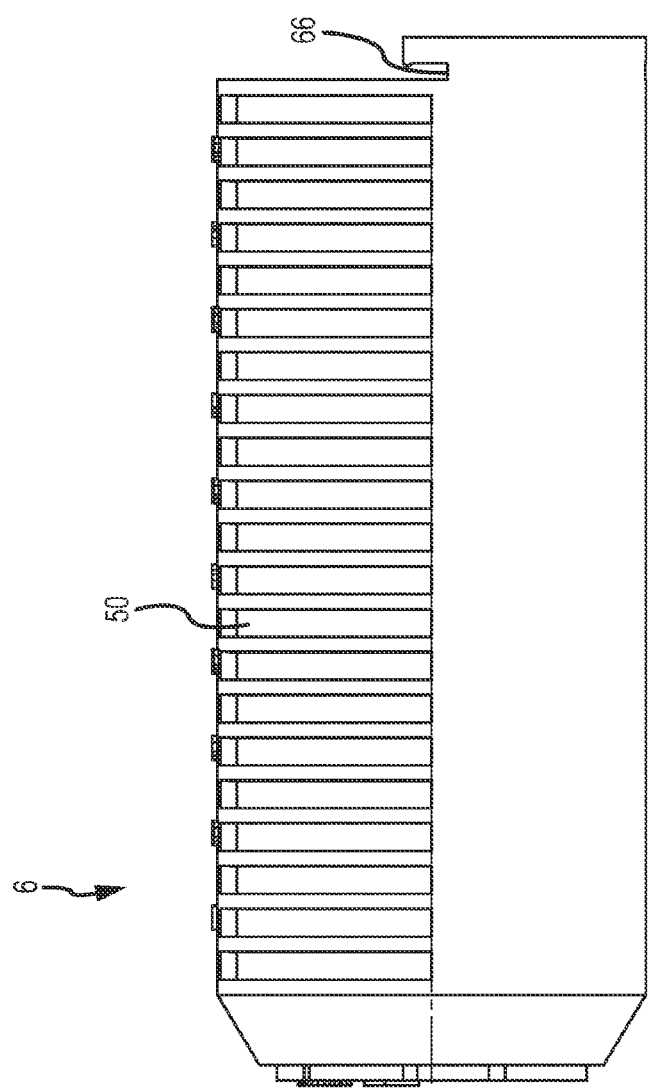

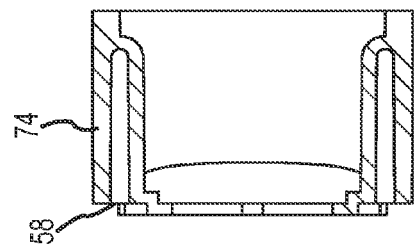
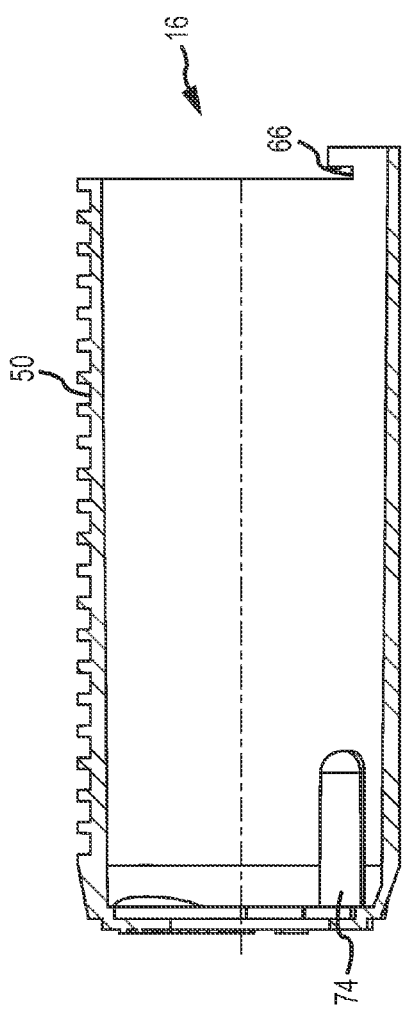
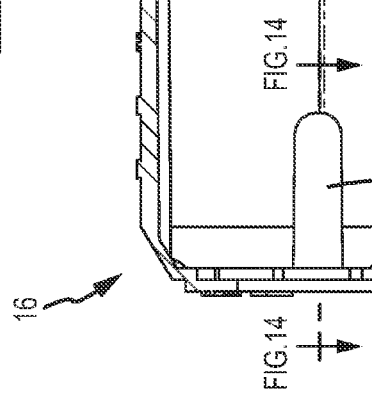

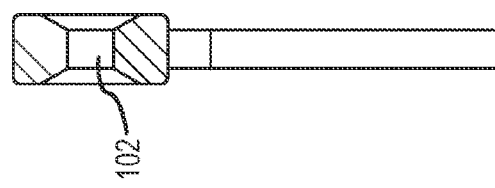
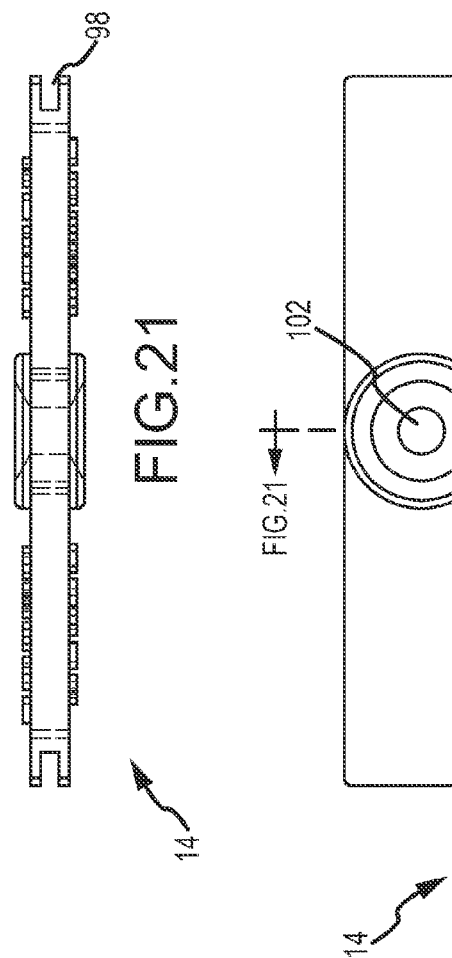
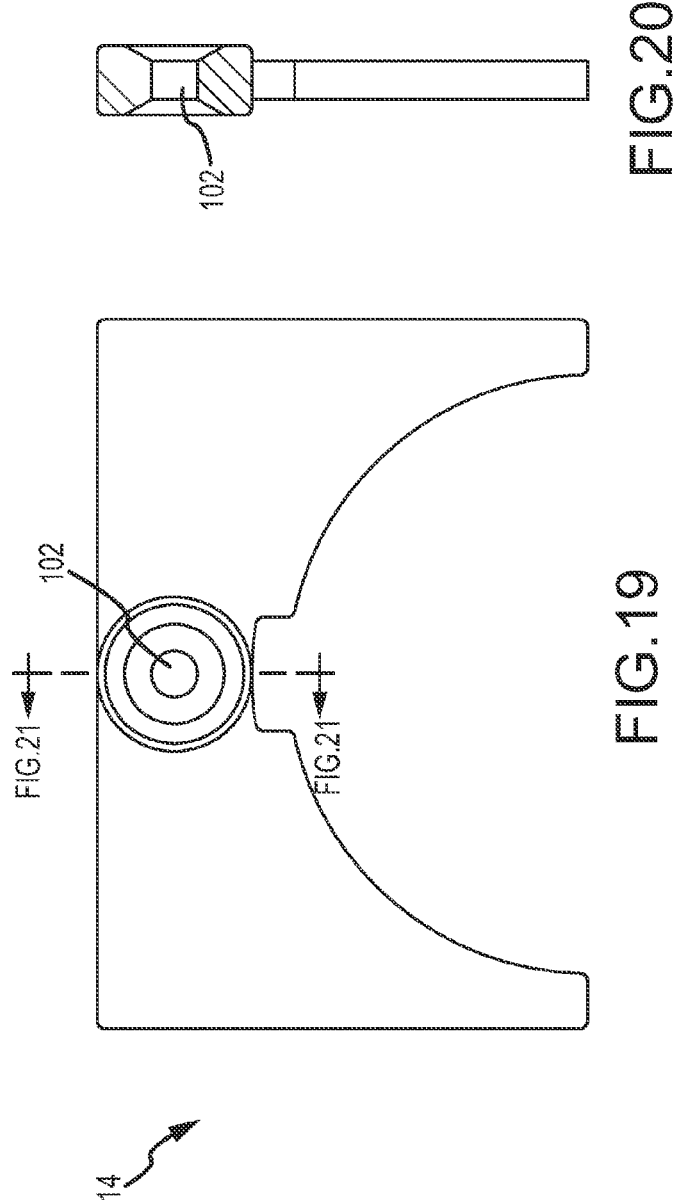

FAUCET MOUNTING SLEEVE

This application claims the benefit of U.S. Provisional Patent Application Ser. No. 60/947,902, filed Jul. 3, 2007, the entire disclosure of which is incorporated by reference herein.

FIELD OF THE INVENTION

Embodiments of the present invention are generally related to devices for securing faucets, or other fluid delivery devices, to a building surface. More specifically, a mounting assembly is used in conjunction with securing a faucet to an uneven exterior surface of a dwelling.

BACKGROUND OF THE INVENTION

Wall faucets are very common and often found mounted to the exterior of a dwelling to be used for supplying water outside of the dwelling. Wall faucets include a faucet assembly with a flange that is designed to interconnect to an exterior surface of a dwelling. The wall faucet assembly also includes a tube that is in fluidic communication with the water source of the dwelling. Traditionally, the flanges have been mounted to an exterior surface, i.e. siding of the dwelling. Siding, however, is not the only exterior building surface employed, and as such, often the wall faucet assembly interconnection must accommodate the uneven surface texture of stone, brick, mortar, stucco etc. One skilled in the art will appreciate that it is difficult to interconnect the flange of the faucet to non-continuous building surfaces. One prior art method of installing a faucet employs a plurality of elongated screws that interconnect the faucet flange to the wall. Long screws, however, are unstable and provide little support to the faucet. For example, one skilled in the art can envision that a hose interconnected to the faucet is subject to forces associated with moving or pulling the hose. These forces may be associated with weakening of the interconnection of the faucet to the dwelling and may cause the faucet to dislocate from the exterior building surface. Thus, faucet assemblies that are interconnected to such non-continuous and uneven building surfaces are often not very structurally stable. If a faucet assembly should separate from the dwelling, fluid (i.e., water), insects, or other outdoor contaminants will be able to enter the dwelling. If the faucet assembly is unstable it could also separate from the fluid supply line, thereby causing water/mold damage.

Furthermore, during installation of a faucet assembly, to an exterior building surface an installer must grout or otherwise seal the interconnection location to accommodate the uneven building surface. This additional work increases the time and cost of installation.

There have been devices in the prior art that are used to offset a faucet from an interior building surface to accommodate a brick surface. For example, attention is drawn to the hose bib supporter of PerfectSett made by JCT Innovations, LLC. This device includes a rectangular shaped face that is offset from a plate that is interconnected to the outer surface of the wall, board or sheathing of a building. The face provides a location for interconnection of a faucet assembly. One drawback of the PerfectSett device is that it does not provide selective adjustments and only accommodates exterior building surfaces of a set thickness.

Thus, it is a long felt need in the field of outdoor plumbing to provide a stable interconnection scheme for attaching wall faucets to the exterior surface of a dwelling. The following disclosure describes an improved method and system for interconnecting a wall faucet to the exterior of a building that addresses and overcomes the problems experienced in the prior art.

SUMMARY OF THE INVENTION

It is one aspect of the present invention to provide a mounting box that supports a faucet assembly. More specifically, embodiments of the present invention employ a mounting sleeve that is associated with a fluid delivery tube that terminates at a faucet. The mounting sleeve is interconnected to at least one supporting bracket. The bracket is adapted for interconnection to an interior building surface, which increases the stability of the interconnection of the faucet assembly to the dwelling. The mounting sleeve is adapted to secure the fluid delivery tube and to provide a location for interconnection of the faucet. Embodiments of the present invention employ a mounting sleeve that is selectively adjustable such that a flange of the faucet, which traditionally is used to secure the faucet to an exterior building surface, may be placed generally adjacent to the outer surface of the dwelling and not interconnected directly to it.

Another aspect of the present invention is to provide a system for mounting a wall faucet to a building that increases the stability of the interconnection of the faucet to the building. More specifically, as opposed to prior art methods of interconnecting a wall faucet assembly to a dwelling, embodiments of the present invention employ one or more brackets that are interconnected to an interior (or exterior) building surface. For example, the brackets of the invention may be interconnected to the inside or outside of any building member, such as 2×4 studs, sill plates, a concrete basement wall, a foundation member, headers, sheathing, etc. Interconnecting the brackets to a structural element improves the structurally stability of the faucet assembly. That is, as opposed to prior art systems, which interconnect a the faucet flange directly to an exterior building surface, the mounting sleeve employed in various embodiments of the present invention is held within the brackets, thus supplying a sufficient support to the faucet assembly. In such a manner the above-identified issues related to interconnecting a faucet to mortar, rock, stone, bricks, stucco, etc., are reduced if not eliminated. The method and associated apparatus of the present invention for securing a tube within mounting sleeve, which is then interconnected to a rigidly interconnected bracket, is superior over prior art methods and system of interconnection.

It is another aspect of the present invention to provide a mounting system and methods that allow for robust installation. More specifically, embodiments of the present invention may be installed prior to or after the siding or other exterior building surface is installed. The brackets that secure the mounting sleeve may be installed by the framers, siding installers or plumbers. Guess work as to the location of the faucet is thus reduced. This aspect of the present invention is made possible by the fact that the faucet does not need to be initially installed in order to install the bracket and to locate the mounting sleeve. After installation of the mounting sleeve, the mounting sleeve may be removed from the bracket and associated with the tube of the faucet, for example.

It is still yet another aspect of the present invention to provide a mounting system and method that provides the ability to selectively adjust the location of the faucet. More specifically, embodiments of the present invention provide a mounting sleeve that is adapted to move in relation to the fixed bracket. A second bracket is employed to secure the mounting sleeve relative to the fixed bracket such that no additional movement of the mounting sleeve is possible. This aspect of the invention ultimately allows for the flange of the faucet to be offset (in various dimensions, but particularly along an axis perpendicular from the dwelling wall) from an interior or exterior wall of the dwelling to accommodate the thickness and surface texture of exterior building material such as stone, etc. In operation, if the faucet is not located as envisioned relative to the exterior building surface, quick readjustments are possible that do not require extensive structural modifications as would be necessary with prior art systems.

It is another aspect of the present invention to provide a faucet assembly attachment scheme that improves mounting options, wherein the faucet may be interconnected to an irregular surface easily. That is, as briefly described above, the mounting device of one embodiment of the present invention includes an adjustable mounting sleeve that allows for selective adjustments of the location of the faucet flange, i.e. within a predetermined scope of dimensions from a first anticipated final position. Thus an installer can easily customize the location of the flange such that it be aesthetically pleasing and structurally stable. Embodiments of the present invention also employ a mounting sleeve with a measurement indication mechanism. Preferably, a linear scale is provided associated with each sleeve, e.g. imprinted thereon, molded thereto, etc., to facilitate the installation of a plurality of faucets about the exterior of a building. After one mounting sleeve is interconnected and correctly offset from a house, the remainder of mounting sleeves will be more quickly installed since the required offset is readily known by inspection of the linear scale. Installers will also be able to facilitate installation of mounting sleeves through experience by knowing generally how much offset should be used for a particular building surface, which will reduce time and cost of installing faucets.

Embodiments of the present invention employ components that can be easily replaced. For example, if after installing the mounting sleeve relative to the bracket it is found that the offset is incorrect, it is contemplated that quick adjustments may be made. More specifically, it is contemplated that the length of the mounting sleeve can easily made in order to accommodate unique sizes of bricks, stone, etc. If this is difficult due, for example, to debris or grout residing in the grooves of the mounting sleeve the mounting sleeve can be discarded and a second replacement mounting sleeve can be interconnected to the bracket.

It is yet another aspect of the present invention to prevent water, debris, animals, insects, etc. from entering the dwelling through the faucet connection. That is, when a faucet of the prior art becomes loose or disconnects from the exterior of the dwelling, gaps form that allow the above-mentioned foreign objects to enter the dwelling. For example, gaps between the flange and the building surface allow moisture to penetrate between the faucet flange and the exterior building surfaces. Embodiments of the present invention provide a system and method that minimizes gaps between the external building surface and the faucet associated thereto. More specifically, since the mounting sleeve of embodiments of the present invention is of generally continuous shape (preferably cylindrical, but other shapes are contemplated), the installer can finish, with insulation, foam, mortar etc., up to the outer surface of the mounting sleeve thus reduces or eliminates gaps between the faucet assembly and the exterior building surfaces. A related aspect of the present invention is that the shape of the mounting sleeve and described finishing creates a cleaner appearance that is more aesthetically pleasing to the eye.

It is another aspect of the present invention that the embodiments preferably be constructed of common materials, such as plastic, steel, aluminum, rubber (or other flexible materials), vulcanized rubber, wood, or any other common building materials that comply with applicable codes. Preferably, the mounting sleeve and associated brackets are made of rigid plastic, which is non-corrosive and provides the needed rigidity to secure the faucet assembly.

It is still yet another aspect of the present invention to provide a system that utilizes components that are easily customizable. More specifically, the mounting sleeves of embodiments of the present invention may be made of any color of plastic to blend in with the finished materials, such as the faucet flange of a handle, thereby adding to the aesthetically pleasing appearance of the finished assembly.

It is yet another aspect of the present invention to provide a faucet mounting system that efficiently utilizes pipes generally found in a dwelling. More specifically, faucet mounting schemes of the prior art generally require that the mounting structure be tied in some way to the sill plate, or other building member associated with the foundation or basement wall of a structure. Mounting a faucet in such a way necessarily requires routing (in often a circuitous path) of additional pipes from the main water supply line to the faucet. One of skill in the art will appreciate that with such a routing scheme the probability of leaks increases, and, if a leak should occur, it is often located in low traffic or little used areas of a dwelling (crawl space, basement, etc.). Leaks of this nature can be very damaging since a homeowner, for example, will be prevented from quickly addressing the matter.

Thus, embodiments of the invention, due to there ability to be interconnected to a dwelling in areas other than the sill plate, can be placed in such a way to omit the need of a long and complex pipe routing scheme. Embodiments of the invention, for example, may be positioned away from the foundation near the water lines connected to a kitchen sink of a dwelling. Mounting a faucet in such away saves piping and facilitates construction. This mounting location also allows enhanced access to the outside faucet since individuals do not have to bend over as much to access the sill cock. Associating the mounting sleeve with existing pipes also has the advantage of allowing a homeowner to more quickly identify leak and freeze issues since the penetration and pipes associated with the outdoor faucet are located in high traffic and often used area of a dwelling. The location and pipe lengths contemplated also facilitate repair operations. Further, due to its proximity to an interior faucet, the mounting sleeves of embodiments of the present invention may be adapted to accommodate at least two pipes, one for hot water and one for cold, for example. Upon review of the figures provided herein one of skill in the art will appreciate that the mounting brackets employed can be sized to accommodate more than one mounting sleeve and/or a mounting sleeve that is interfaced to more than one fluid pipe.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 8 is a top plan view of FIG. 7;

FIG. 9 is front elevation view of FIG. 7;

FIG. 12 is a cross-sectional view of FIG. 10;

FIG. 13 is a cross-sectional view of FIG. 12;

FIG. 14 is a cross-sectional view of FIG. 10;

FIG. 19 is a front elevation view of the top bracket shown in FIG. 18;

FIG. 20 is a cross-sectional view of FIG. 19;

FIG. 21 is a top plan view of FIG. 19;

Figure 1:
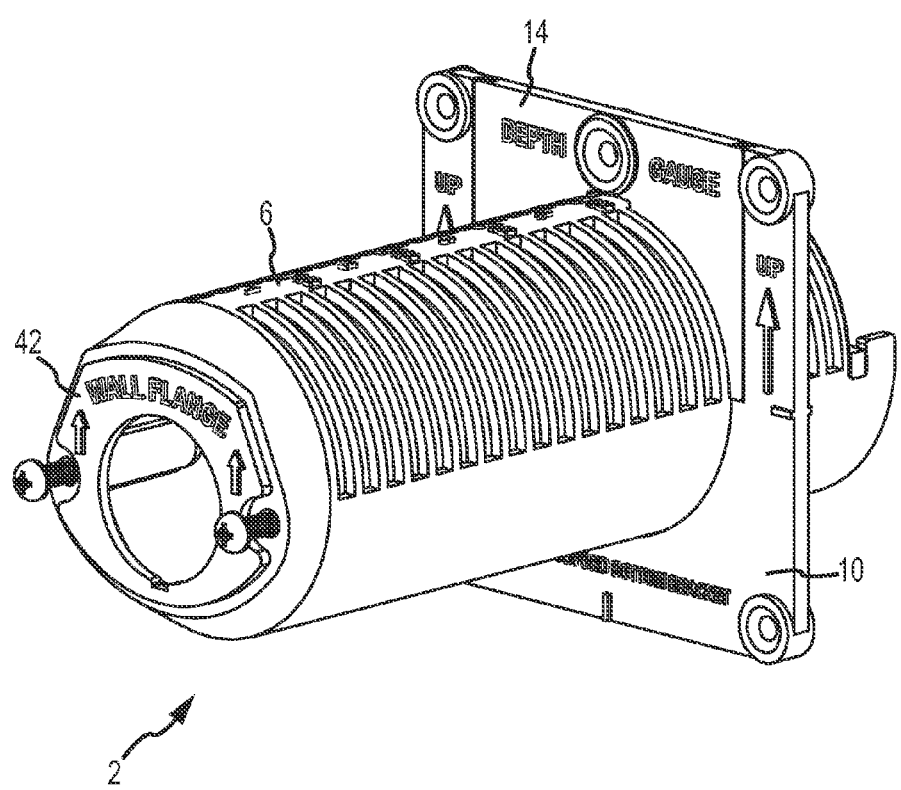
FIG. 1 is a front perspective view of a faucet mounting assembly of one embodiment of the present invention.
Figure 2:
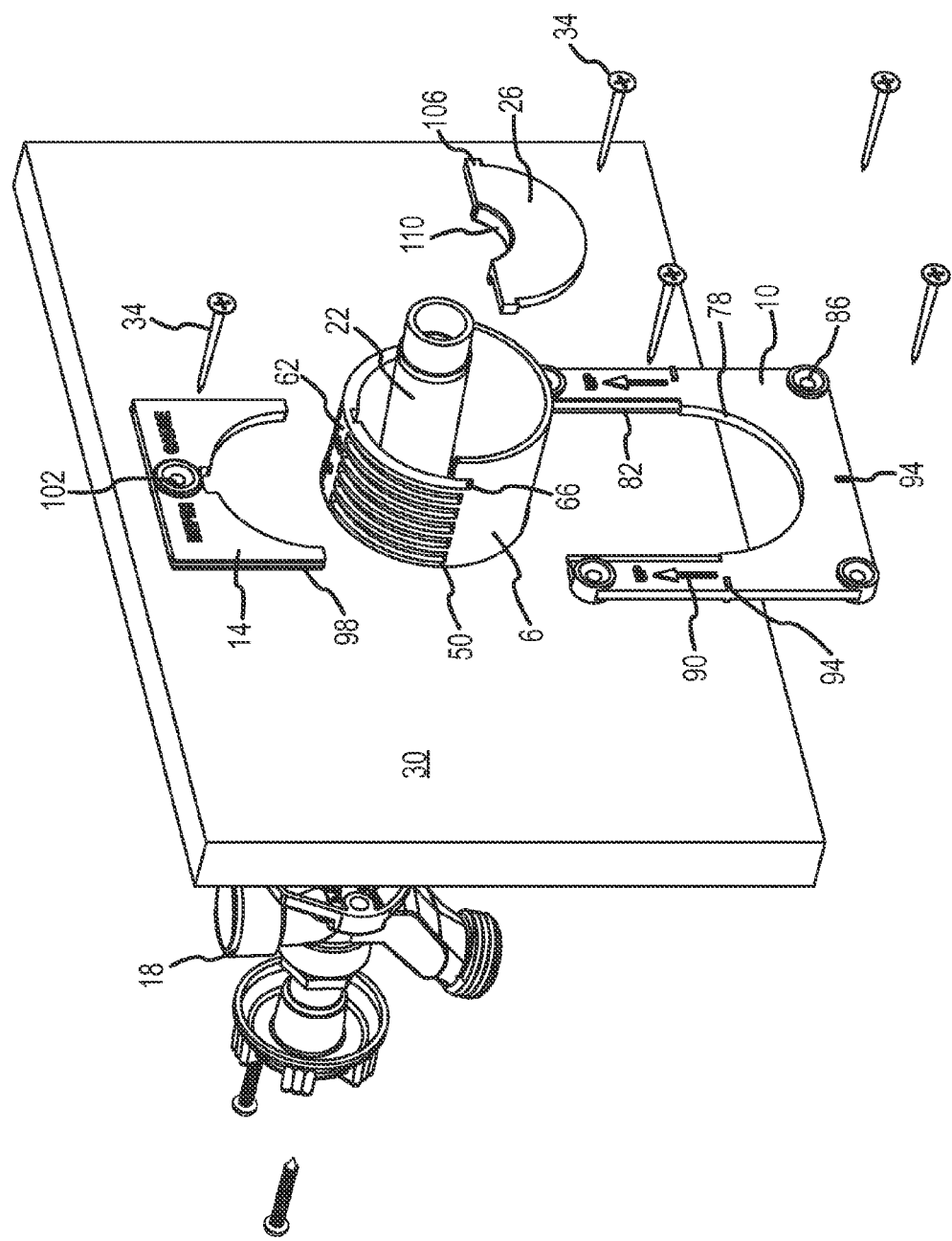
FIG. 2 is an exploded rear perspective view of the faucet mounting assembly of FIG. 1 interconnected to a wall.
Figure 3:
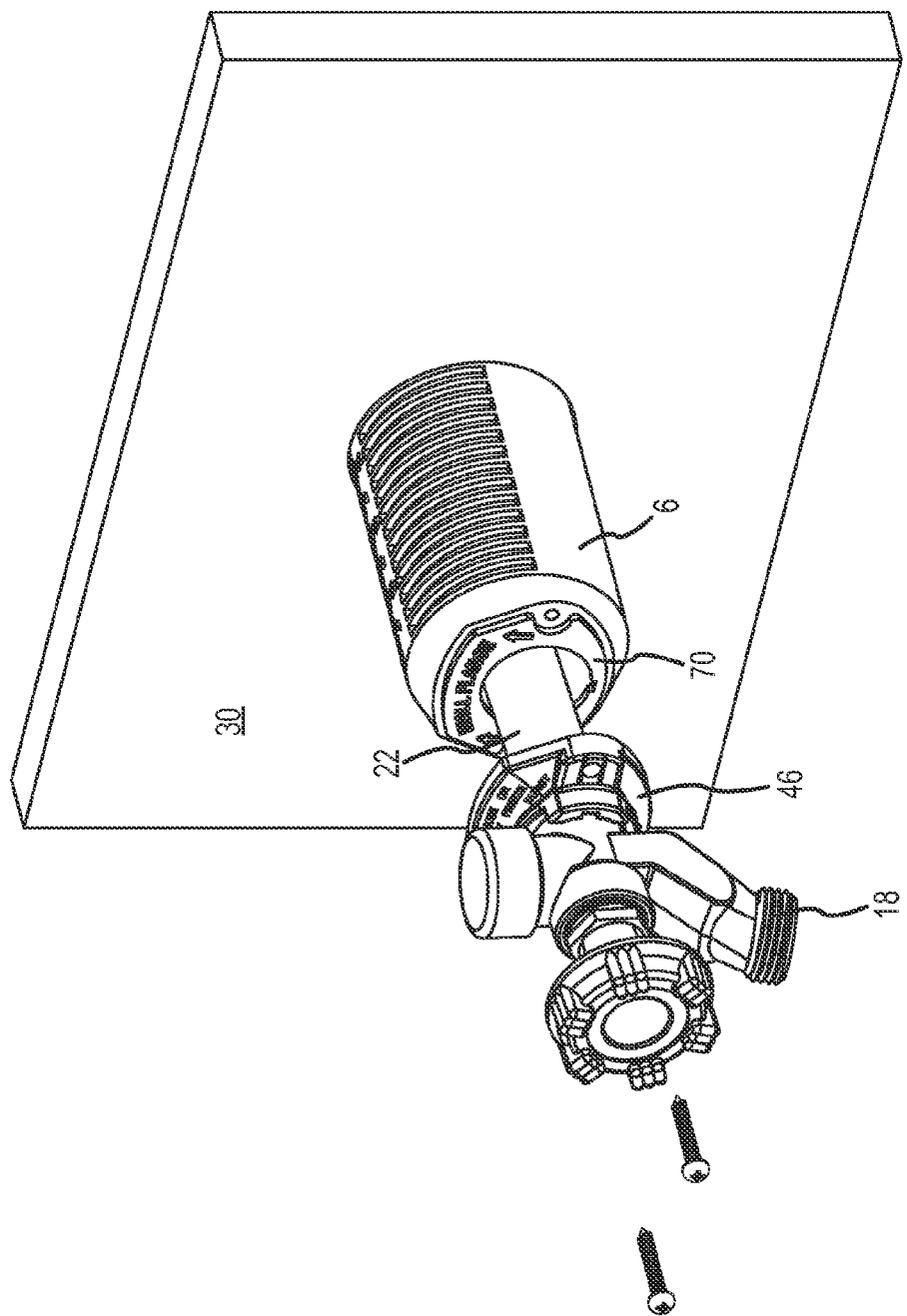
FIG. 3 is a front perspective view of a faucet assembly positioned in the faucet mounting assembly of one embodiment of the present invention.

To assist in the understanding of the present invention the following list of components and associated numbering found in the drawings is provided herein:

| # | Components |
|---|---|
| 2 | Faucet mounting assembly |
| 6 | Mounting sleeve |
| 10 | Bottom bracket |
| 14 | Top bracket |
| 18 | Faucet |
| 22 | Tube |
| 26 | Tube rest |
| 32 | Mortar |
| 30 | Wall |
| 34 | Fastener |
| 38 | Exterior building material |
| 42 | Sleeve flange |
| 46 | Faucet flange |
| 50 | Groove |
| 54 | Front opening |
| 58 | Aperture |
| 62 | Offset indicator |
| 66 | Slot |
| 70 | Orientation arrow |
| 74 | Boss |
| 78 | Mounting sleeve rest |
| 82 | Tongue |
| 86 | Aperture |
| 90 | Orientation arrow |
| 94 | Alignment mark |
| 98 | Channel |
| 102 | Aperture |
| 106 | Protrusion |
| 110 | Tube resting surface |
| 114 | Bracket |
| 118 | Plate |
| 122 | Pin |
| 126 | Tab |
| 130 | Slot |
| 134 | Dimple |
| 138 | Pin |
| 142 | Stud |
| 146 | Spine |
| 150 | Threads |
| 154 | Hook |

It should be understood that the drawings are not necessarily to scale, but that relative dimensions can be nevertheless be determined thereby. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-33, a faucet mounting assembly 2 of one embodiment of the present invention is provided that includes a mounting sleeve 6 that is selectively interconnected to a bottom bracket 10. The mounting sleeve 6 is held in place relative to the bottom bracket 10 by a top bracket 14. In operation, a faucet 18 and associated tube 22 are designed to interface with the mounting sleeve 6, thereby securing the faucet 18 to a dwelling. A tube rest 26 is interconnected to a rear portion of the mounting sleeve 6 that supports and angles the tube 22 such that drainage is facilitated which prevents freezing. Embodiments of the present invention are designed to interconnect to an interior wall 30 of a building via a plurality of fasteners 34, thus creating a stable interconnection between the faucet assembly (i.e., the faucet 18 and tube 22) over the interconnection schemes employed by the prior art. In operation, the bottom bracket 10 is interconnected to the wall 30 and mounting sleeve 6 is selectively positioned relative thereto to accommodate variations of an exterior building surface 38. Once a desirable length is achieved, the top bracket 14 is associated with the bottom bracket 10 to fix the mounting sleeve 6 in place. As will be shown and/or described, the mounting sleeve 6 may be of multiple pieces that are interference fit together or the mounting sleeve may possess a combination of grooves, threads and/or interference fits to provide a robust scheme of selective offsets to accommodate any type of building surface. Further, the sleeve may be easily shortened by sawing or the inclusion of break-away points, for example, that allow selective reduction in length.

Referring now to FIG. 1, the faucet mounting assembly 2 of one embodiment of the present invention is provided. Here, the mounting sleeve 6 is substantially cylindrical and is positioned between the bottom bracket 10 and the top bracket 14. The bottom bracket 10 is designed to support the mounting sleeve 6 and the top bracket 14 is designed to maintain the mounting sleeve 6 in a fixed location relative to the bottom bracket 10. A front surface of the mounting sleeve 6 includes a sleeve flange 42 that is adapted to receive and secure a faucet flange. The sleeve flange 42 may be selectively interconnected to said mounting sleeve 6.

Referring now to FIGS. 2-6, the faucet mounting assembly 2 of embodiments of the present invention are shown interconnected to a wall 30 of the dwelling. Here, the wall 30, be it wood or concrete, is drilled through to accommodate the mounting sleeve 6. The mounting sleeve 6 is then inserted through the hole provided through the wall 30. The bottom bracket 10 is then brought up to provide support to the mounting sleeve 6 and to provide a location for the interconnection of a top bracket 14. One of skill in the art will appreciate that the bottom bracket 10 may be installed prior to installation of the mounting sleeve 6. Further, the bottom bracket 10 may be interconnected to the wall 30 prior to drilling therethrough to function as a hole location device. The top bracket 14 of embodiments of the present invention is then slid onto the bottom bracket 10 and both brackets are secured to the wall 30. One of skill in the art will appreciate that the mounting sleeve may be secured within a bracket positioned therearound wherein the mounting sleeve is held in place by a bar that is associated with the bracket and that engages the mounting sleeve.

Prior to adding exterior surface materials 20 to a building (or after), the faucet 18 is interconnected to the sleeve flange 42 and the tube 22 is inserted into the mounting sleeve 6. Embodiments of the present invention reduce the chance of the faucet 18 being installed upside down since the sleeve flange 42 of the mounting sleeve 6 includes features that match the faucet flange 46. The mounting sleeve 6, top bracket 14 and bottom bracket 10 may include indicia as well to insure the correct installation of the mounting sleeve.

The tube rest 26 is selectively interconnected to the rear end of the mounting sleeve 6. The tube rest 26 provides the proper offset from a center axis of the mounting sleeve 6 such that the tube 22 preferably positioned at an angle α, which will be shown succinctly below in FIG. 6. The angle of the tube 22 allows for water therein to drain from the faucet 18, thereby reducing the chances of freeze damage. Tube rests 26 of other embodiments of the present invention may be integral to the mounting sleeve 6.

Figure 4:
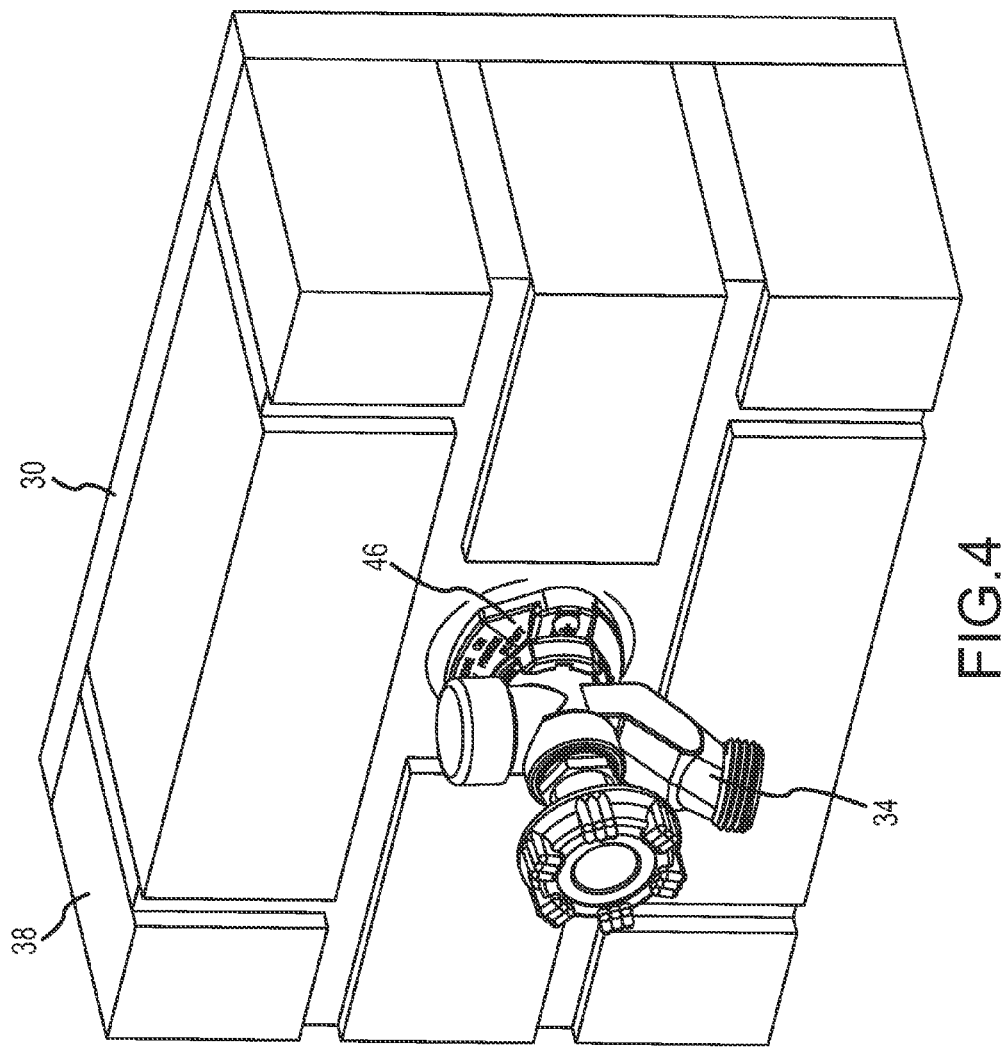
FIG. 4 is a front perspective view of a faucet assembly secured by a faucet mounting assembly positioned adjacent to an exterior building surface.
Figure 5:
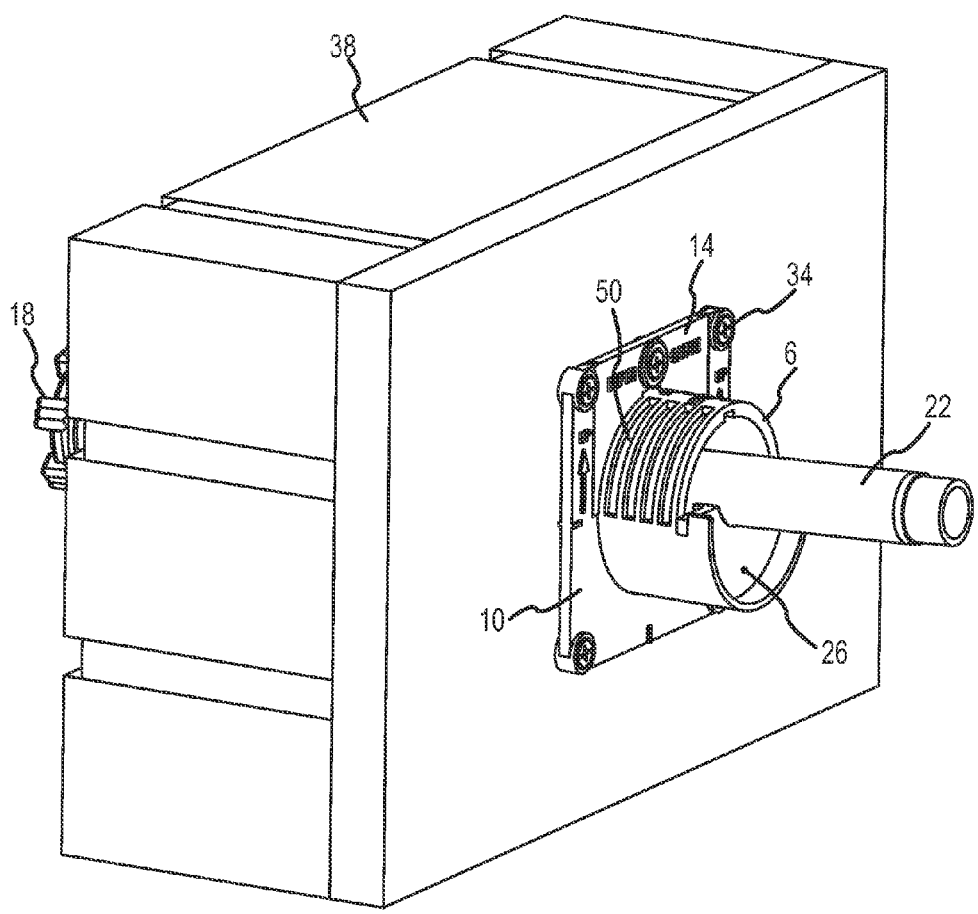
FIG. 5 is a rear perspective view of a faucet assembly secured by a faucet mounting assembly positioned adjacent to an exterior building surface.
Figure 6:
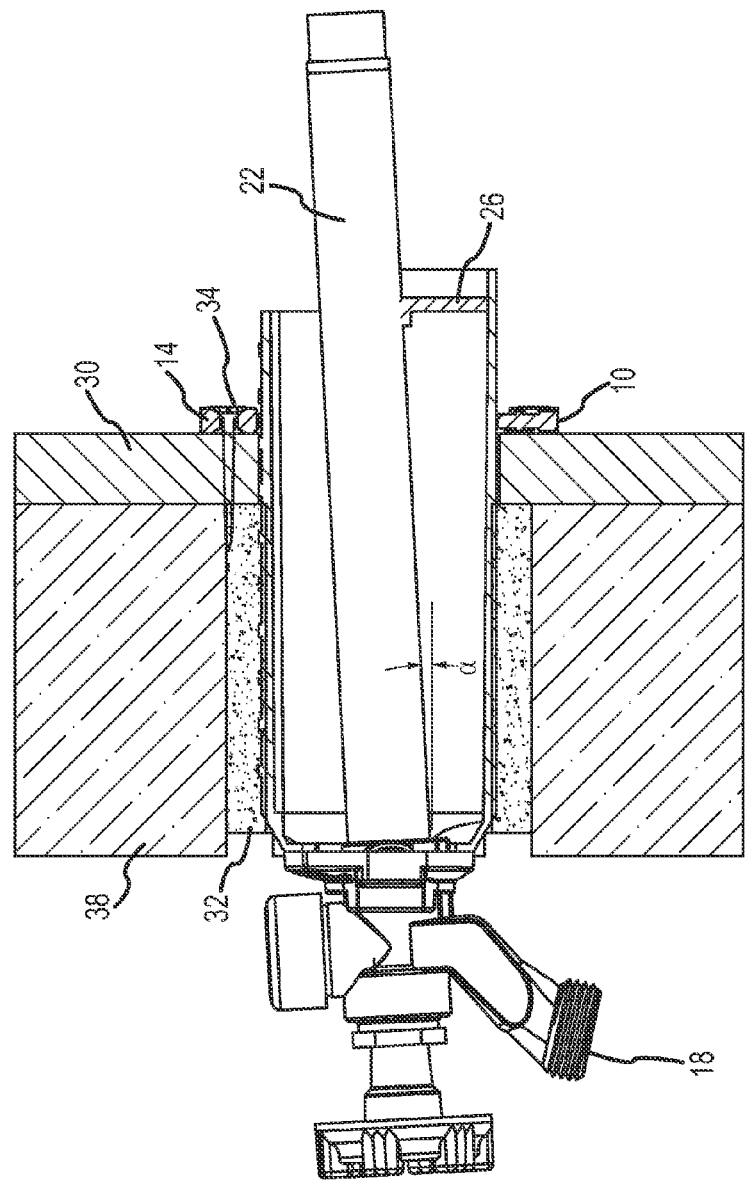
FIG. 6 is a side cross-sectional view of a faucet assembly secured by a faucet mounting assembly positioned adjacent to an exterior building surface.
Figure 7:
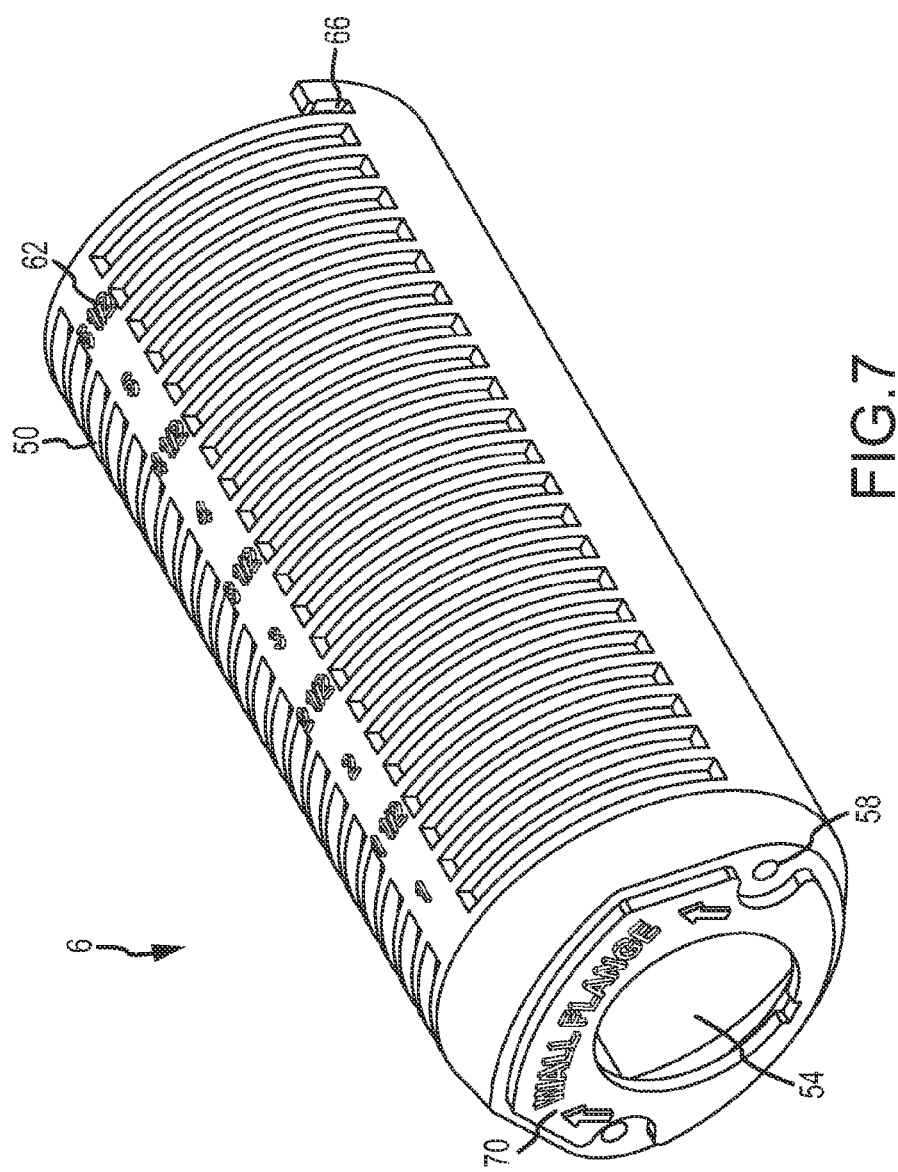
FIG. 7 is a perspective view of the mounting sleeve of one embodiment of the invention.
Figure 11:
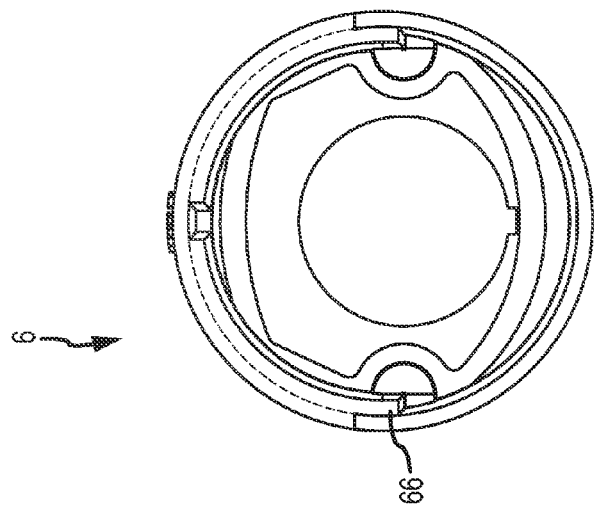
FIG. 11 is a right elevation view of FIG. 9.

With specific reference to FIGS. 4-6, the bottom bracket 10 may be directly interconnected to the wall 30. As shown herein, a plurality of external building surfaces 38, such as bricks, are positioned about the exterior surface of the mounting sleeve 6. These figures illustrate the above-mentioned aspect of the invention wherein the mounting sleeve 6 may be positioned relative to the bottom bracket 10, and wall 30, to accommodate such irregular building surfaces 38. After the top bracket 14 is installed, which locks the mounting sleeve 6 in place, mortar 32 or other finishing materials may be placed in the gap between the mounting sleeve 6 and the exterior building surface 38 to provide an aesthetically pleasing look. Although the mounting sleeve 6 has been shown thus far as cylindrical, one skilled in the art will appreciate that it may be prismatic with a square or rectangular profile. This profile may better suit applications wherein brick is employed, for example, wherein brick and/or mortar may be directly interconnected to the mounting sleeve 6. The mounting sleeve 6 may be made as large as a brick and may be any size to accommodate any building surface 38 or faucet 18 configuration.

Referring now specifically to FIG. 6, a cross-sectional view of the faucet mounting assembly 2 is shown. Here, it is succinctly shown how the top bracket 14 and bottom bracket 10 are interconnected to the interior wall 30 of a dwelling, thereby providing increased rigidity. As mentioned above, the prior art interconnection schemes would simply interconnect the faucet flange 46 directly to the exterior surface 38, such as mortar, which is a less than ideal interconnection material. It is also shown in FIG. 6 that the tube rest 26 supports the tube 22 such that an angle α is provided that allows for water trapped within the tube 22 to drain from the faucet 18 after water is shut off. Although shown herein, a brick exterior building material 38 is shown, one skilled in the art will appreciate that embodiments of the present invention are adapted to be used with various types of building components, such as stone, mortar, stucco, hay, siding, corrugated steel, etc. That is, the mounting sleeve 6 is adapted to move relative to the bottom bracket 10 and top bracket 14 and be selectively locked into place, thereby providing a sufficient offset to accommodate any uneven exterior building material 38. After installation is complete, an installer may add mortar or other materials between the exterior building surfaces 38 and the mounting sleeve 6 to provide an aesthetically pleasing visual assembly.

Referring now to FIGS. 7-14, a mounting sleeve of one embodiment of the present invention is shown. The mounting sleeve of one embodiment of the present invention is cylindrical wherein a plurality of grooves 50 are positioned on at least an upper surface thereof. The grooves 50 are adapted to receive a portion of the top bracket, thereby preventing axial motion of the mounting sleeve 6 after installation. The faucet and associated tube are threaded through a front opening 54 positioned in the sleeve flange 42. The mounting sleeve 6 includes at least one aperture 48 that receive fasteners that interconnect the faucet flange onto the sleeve flange 42 of the mounting sleeve 6. The mounting sleeve 6 may also include an offset indication device 62, preferably, embossed or raised numerals or alpha numeric characters that allow for an installer to gauge the distance between the sleeve flange 42 and the top and bottom brackets. The mounting sleeve 6 also includes a slot 66 positioned adjacent to its rear end to receive the tube rest.

Figure 10:
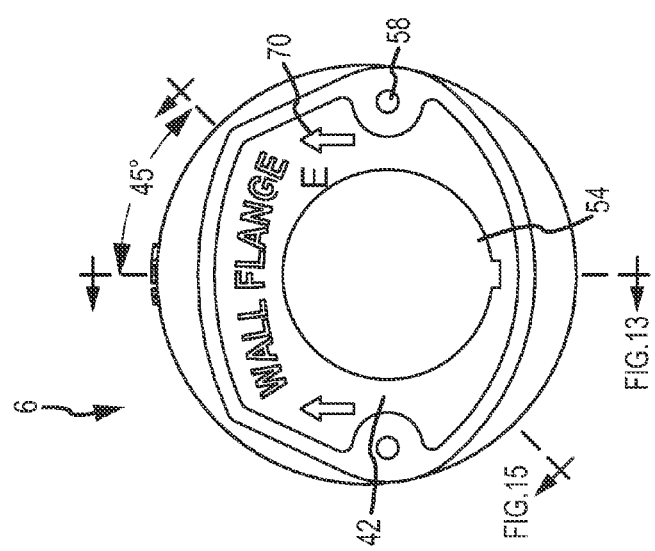
FIG. 10 is a left elevation view of FIG. 9 showing a flange of the mounting sleeve.

Referring now specifically to FIG. 10, the sleeve flange 42 of the mounting sleeve 6 is shown. The sleeve flange 6 is designed to generally match the faucet flange, thereby reducing incorrect orientations. The sleeve flange 42 may also include orientation arrows 70 to ensure that the mounting sleeve 6 is oriented in the proper fashion.

Referring now to FIGS. 12-14, cross-sectional views of the mounting sleeve 6 are shown. Here, a plurality of bosses 74 are provided that are associated with the apertures 58 positioned in the sleeve flange. The bosses 74 may be threaded or unthreaded and are designed to receive fasteners that interconnect the faucet flange to the mounting sleeve 6. The slots 66 are also provided adjacent to the rear end of the mounting sleeve 6. The slots 66 are adapted to receive a protrusion of a tube rest, which will be explained in further detail below. The mounting sleeve 6 may be of any diameter to fit any size tube. In addition, additional internal walls may be provided to further support the tube. Alternatively insulation, i.e. expandable foam, may be added into the mounting sleeve 6 after the tube is inserted to firmly associate the tube with the mounting sleeve 6.

It is contemplated that the mounting sleeve may be made in more than one piece. More specifically, embodiments of the present invention employ a two-piece mounting sleeve 6 that includes one portion that comprises the slot 66 for receiving the tube rest. The other portion would accommodate the faucet flange. The flange portion that receives the flange faucet may be capable of an angular or axial adjustment with respect to the portion that is supported by the brackets. The portions may be interconnected, via heat welding, threaded interconnection, or interference fit. Further, the length of the mounting sleeve 6 is arbitrary and can be customized for any application.

Preferably the mounting sleeve 6 of one embodiment of the present invention is cylindrical and about 6 inches long and about 2.5 inch diameter. The bosses 74 integrated in the mounting sleeve 6 are approximately 1.3 inches deep with a center bore of about 1.2 inches deep that have a radius of about 0.15 inches. The grooves 50 of one embodiment of the present invention are 0.16 inches wide and may include an about 0.5 degree draft, and are equally spaced along the length of at least an upper portion of the mounting sleeve 6. Embodiments of the present invention employ grooves that are about 0.097 inches deep.

Figure 15:
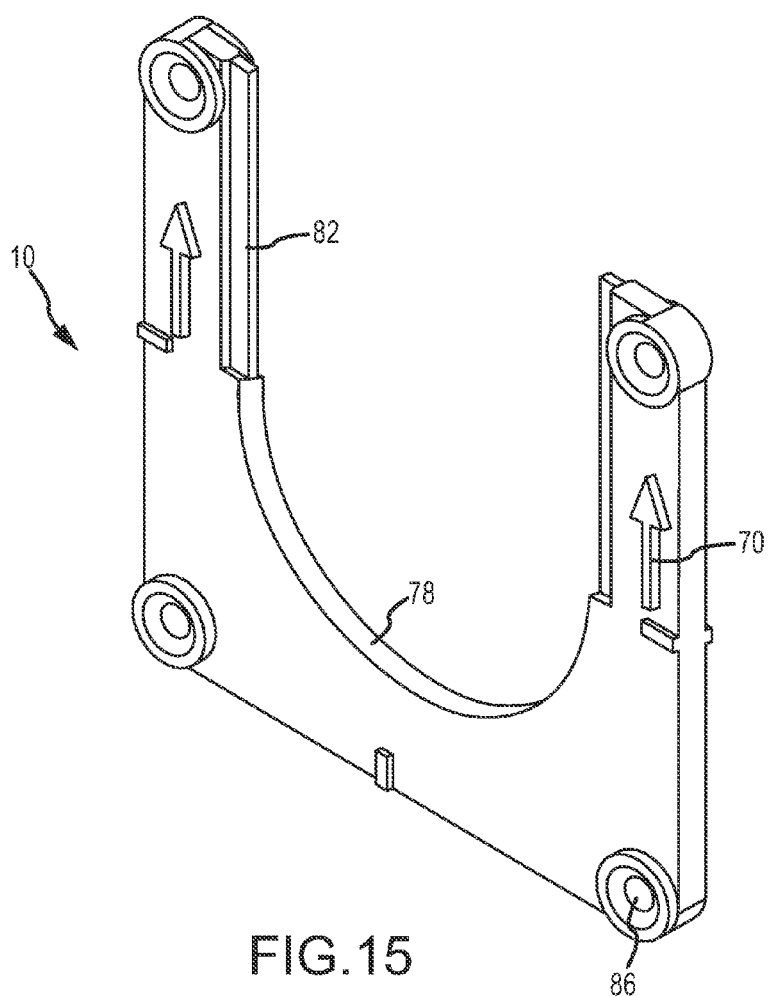
FIG. 15 is a perspective view of a bottom bracket of one embodiment of the present invention.
Figure 17:
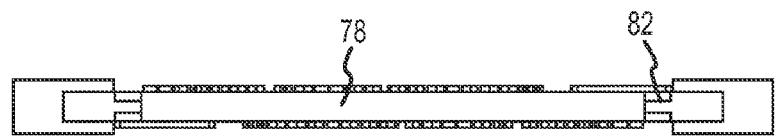
FIG. 17 is a cross-sectional view of the bottom bracket shown FIG. 16.
Figure 16:
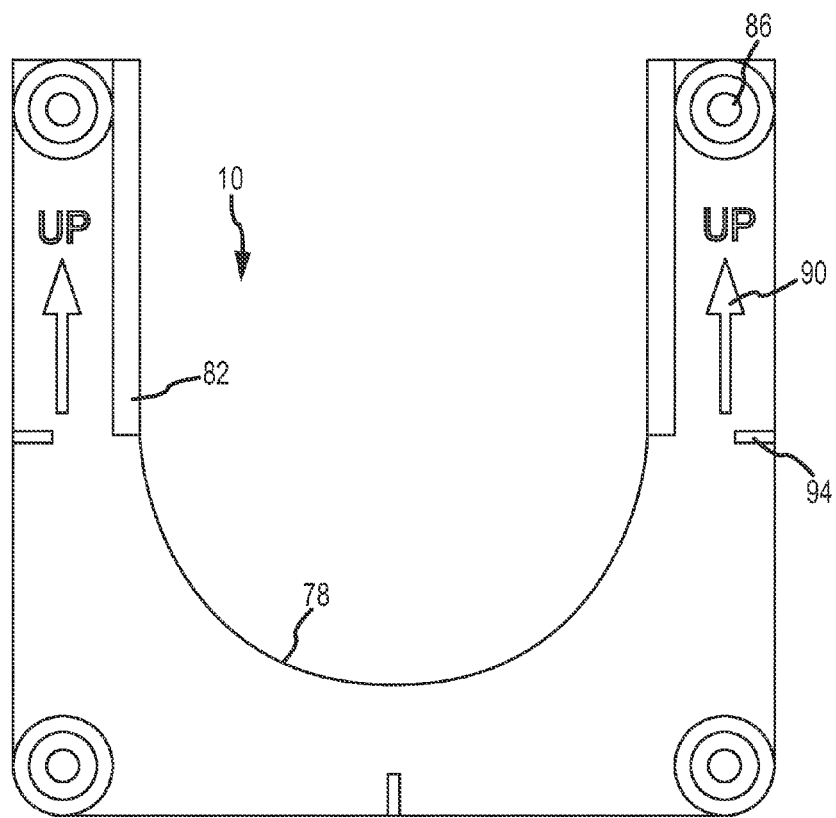
FIG. 16 is a front elevation view of the bottom bracket shown in FIG. 15.
Figure 18:
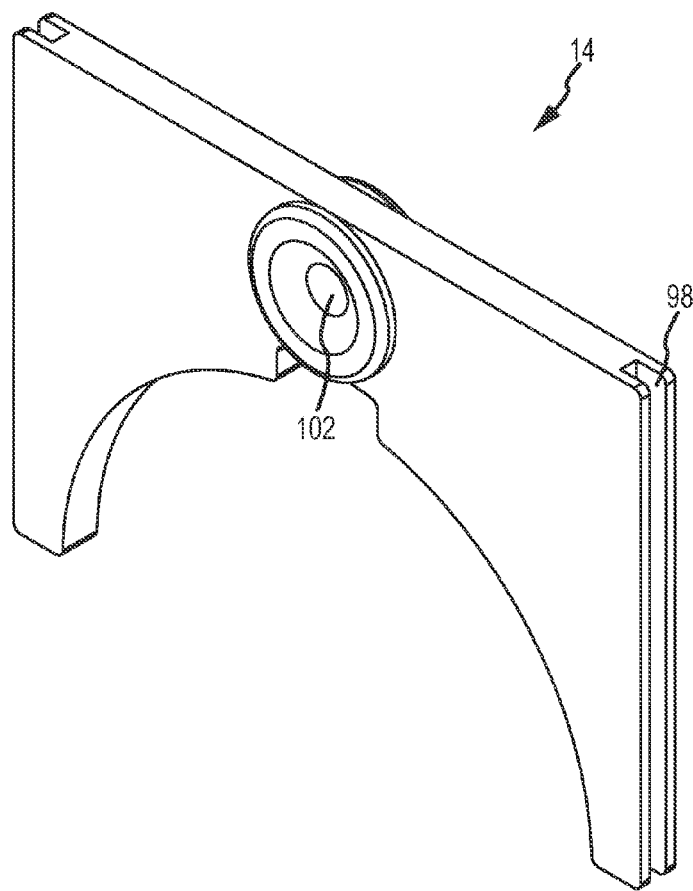
FIG. 18 is a perspective view of a top bracket of one embodiment of the present invention.

Referring now to FIGS. 15-17, the bottom bracket 10 of one embodiment of the present invention is shown. The bottom bracket 10 includes an arcuate (in the case of a cylindrical mounting sleeve) mounting sleeve rest 78. The mounting sleeve rest 78 surface includes an about 180 degree arc that leads into a pair of inwardly positioned tongues 82 that are adapted to receive the top bracket, which will be described in further detail below. The bottom bracket 10 also includes a plurality of apertures 86 for the receipt of fasteners for interconnection to the wall. Further, the bottom bracket 10 includes an orientation arrow 70, or other device for indicating the proper positioning of the bottom bracket 10 during installation. The bottom bracket 10 may also include at least one alignment mark 94 which helps locate the hole to be drilled in the wall.

In one embodiment of the present invention, the bottom bracket 10 is about 3.8 inches high and 3.8 inches wide. The apertures 86 possess an about 0.180 diameter for receiving a fastener. The apertures 86 are spaced about 3.3 inches in the horizontal direction and about 3.3 inches in the vertical direction. The mounting sleeve rest is about 1.26 inches in radius.

Referring now to FIGS. 18-21 the top bracket 14 of embodiments of the present invention is shown that includes channels 98 that receive the tongues of the bottom bracket, thereby locking the top bracket 14 relative thereto. The top bracket 14 also includes a surface that rests within the grooves of the mounting sleeve, thereby preventing the relative motion of the mounting sleeve after installation. The top bracket 14 also includes at least one aperture 102 for the receipt of a fastener that interconnects the top bracket 14 to the wall.

In one embodiment of the present invention, the top bracket is about 1.9 inches high and 2.75 inches wide. The surface that receives the groove has the radius of about 1.16 inches. The channel, that receives the tongue of the bottom bracket is about 0.7 inches wide.

Figure 22:
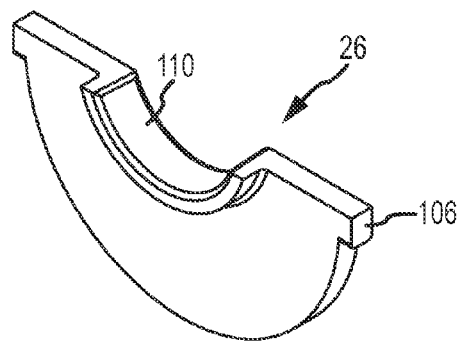
FIG. 22 is a perspective view of a tube rest employed by some embodiments of the present invention.
Figure 23:
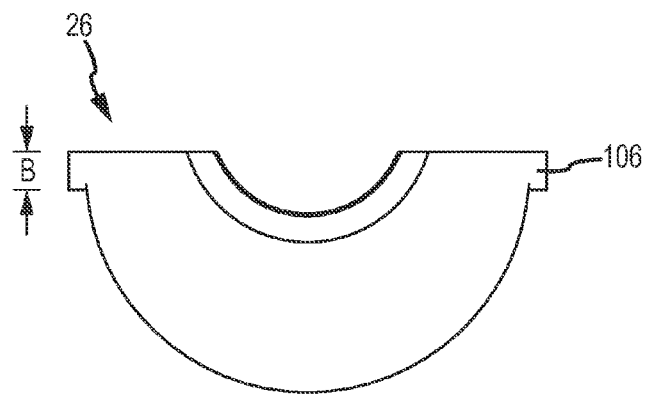
FIG. 23 is a front elevation view of FIG. 22.

Referring now to FIGS. 22 and 23, the tube rest 26 of one embodiment of the present invention is shown that includes a plurality of protrusions 106 that fit into the slots located in the mounting sleeve. To alter the angle α of the installed tube, the protrusions 106 and/or slots can be selectively increased or decreased in thickness (β). For example, the greater the thickness (β) of the protrusion, the greater the tilt of the installed tube. Another protrusion may be positioned on the bottom portion of the tube rest 26 to provide alignment that maintains the tube rest 26 in an interconnective relationship with the mounting sleeve. The tube rest 26 includes a resting surface 110 that may be widened to enhance support of the installed tube.

Figure 24:
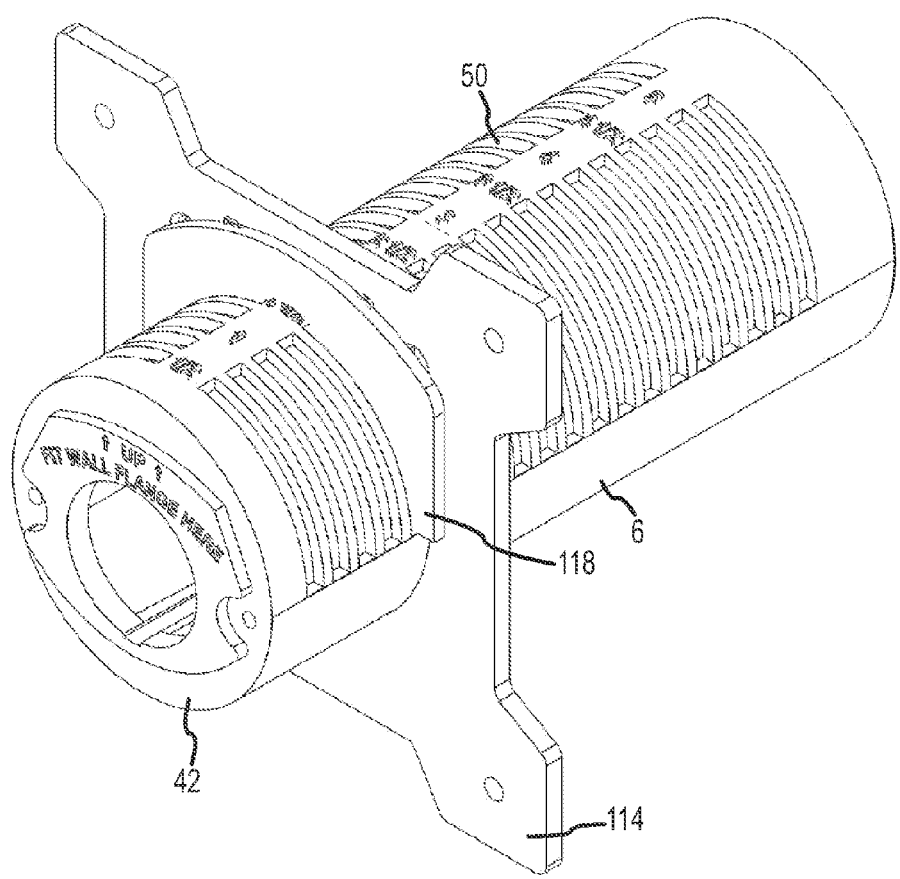
FIG. 24 is a perspective view of a faucet mounting assembly of another embodiment of the present invention.
Figure 25:
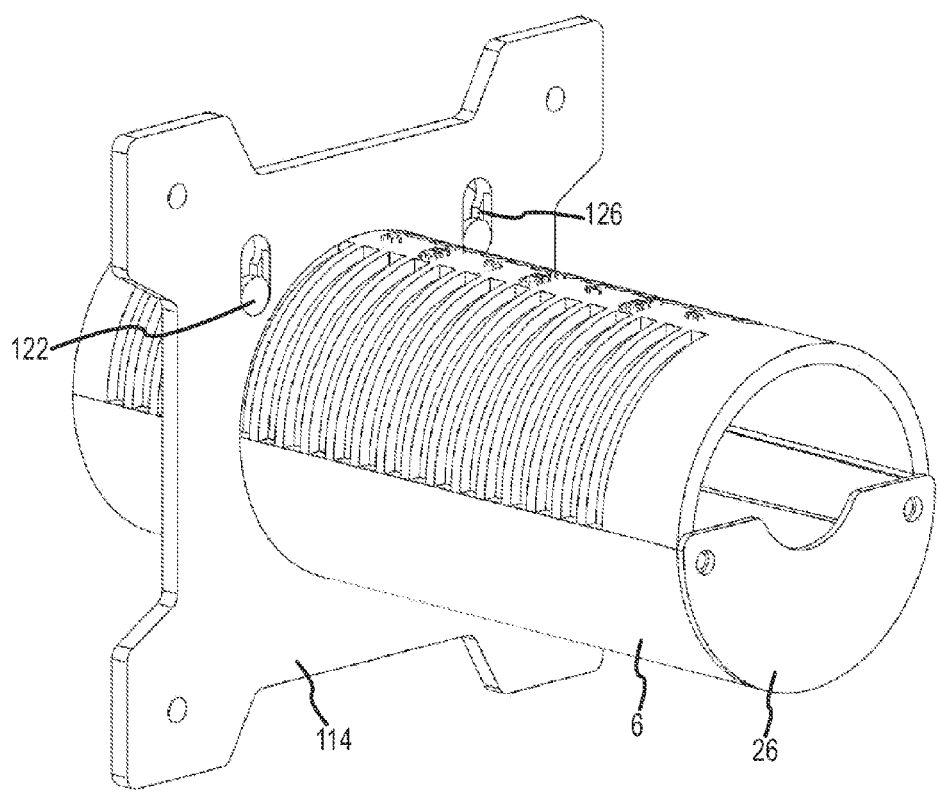
FIG. 25 is a rear perspective view of the embodiment of the present invention shown in FIG. 24.

Referring now to FIGS. 24 and 25, yet another embodiment of the present invention is shown that employs a mounting sleeve 6 similar to that described above. The bracket 114, however, is of a one-piece design that employs a plate 118. The plate 118 is selectively interconnected to the bracket 114 to secure the mounting sleeve 6. The plate 118 may include a plurality of pins 122 that interface with tabs 126 positioned on the bracket.

Figure 26:
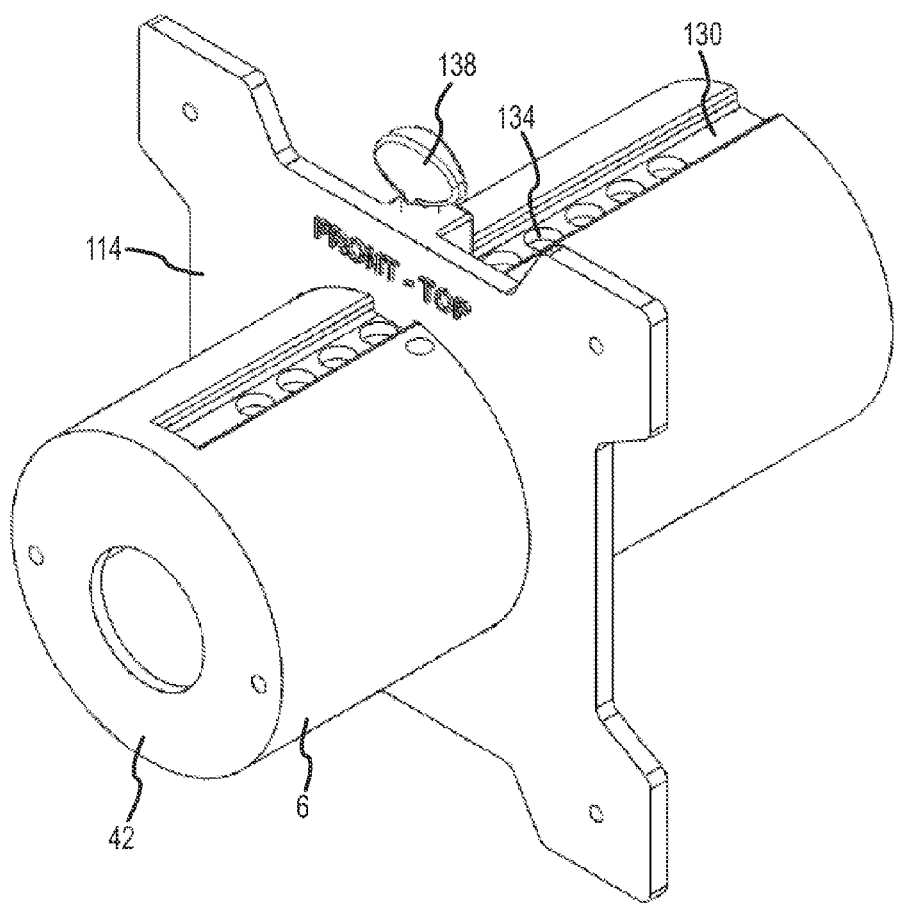
FIG. 26 is a perspective view of a faucet mounting assembly of another embodiment of the present invention.
Figure 27:
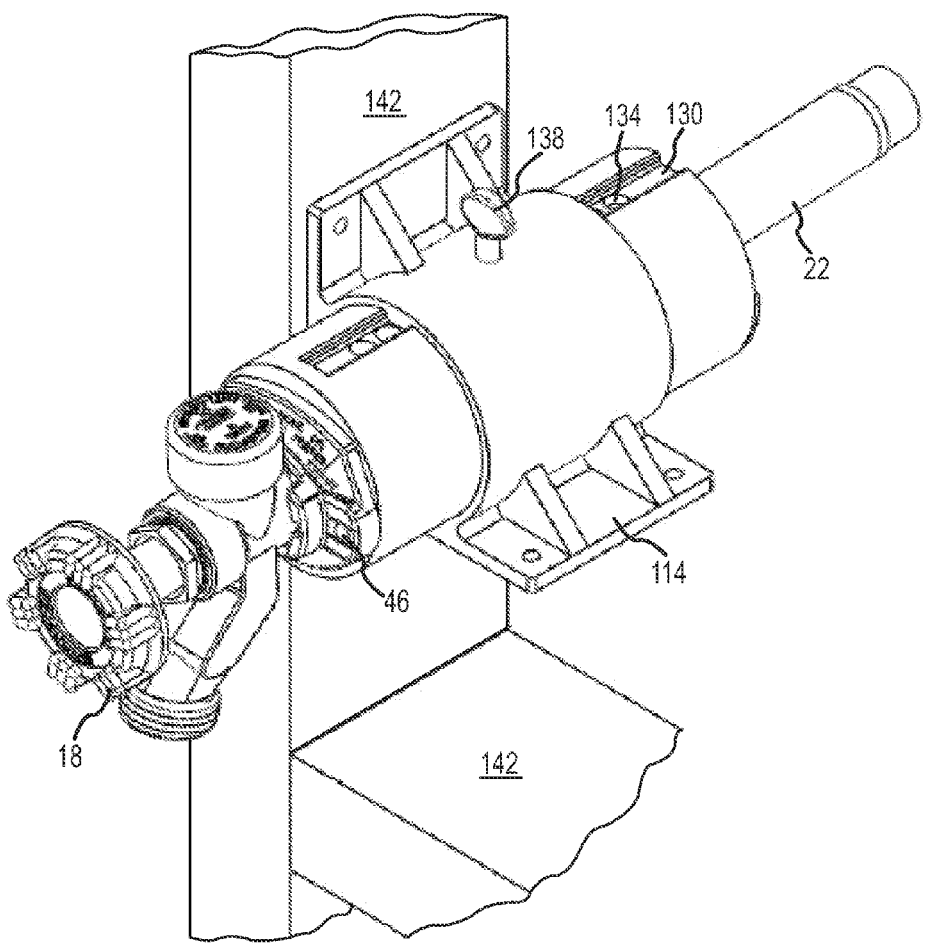
FIG. 27 is a perspective view of another embodiment of a faucet mounting assembly similar to that shown in FIG. 26.

Referring now to FIGS. 26 and 27, another embodiment of the present invention is shown that employs a mounting sleeve 6 with a longitudinal slot 130. The slot 130 further includes a plurality of dimples 134 or holes. The bracket 114 of this embodiment of the present invention includes a selectively adjustable pin 138 that interfaces with a dimple 134 to restrict the movement of the mounting sleeve 6 relative to the bracket 114. It is contemplated that the pin 138 be spring loaded, threaded into the bracket 114, or simply dropped into a dimple 134 to secure the mounting sleeve 6. FIG. 27, specifically shows an alternate embodiment of a bracket 114 that contacts a greater portion of the mounting sleeve 6, thereby providing additional stability. This elongated bracket 114 also is adapted for interconnection to at least one stud 142.

Figure 28:
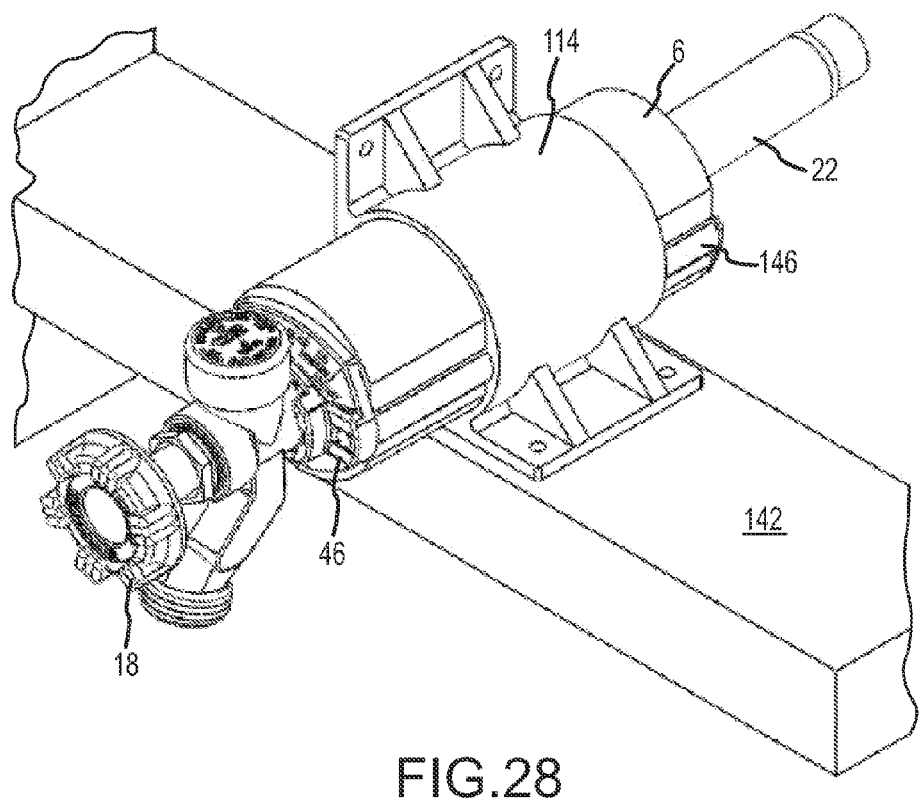
FIG. 28 is a perspective view of a faucet mounting assembly of another embodiment of the present invention.

Referring now to FIG. 28, the bracket shown in FIG. 27 is shown without the pin. More specifically, this embodiment of the present invention employs a mounting sleeve 6 with a longitudinal spine 146. The function of the spine 146 is to interface with an inner portion of the bracket 114, thereby preventing rotation of the mounting sleeve 6. One skilled in the art, however, will appreciate that the spine 146 does not need to span the entire length of the mounting sleeve 6 to perform its designed function. Upon review of the figure, one skilled in the art will appreciate that this version of the mounting sleeve includes no screws thus may be axially altered.

Figure 29:
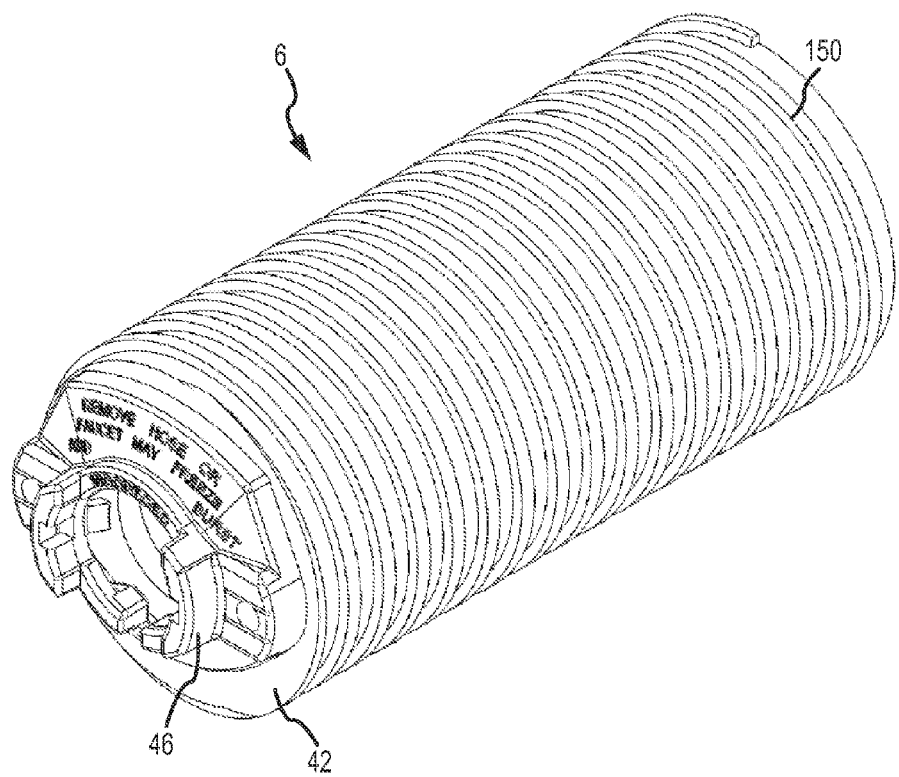
FIG. 29 is a perspective view of an alternate embodiment of a mounting sleeve.

Referring now to FIG. 29, an alternate embodiment of a mounting sleeve 6 is shown that employs a threaded outer surface. It is envisioned that the threads 150 will interface with threads provided on the bracket to allow adjustments of the mounting sleeve 6 relative to the bracket. It is also contemplated that this type of mounting sleeve 6 may be incorporated with mounting sleeves previously described wherein the threaded mounting sleeve provides fine adjustments compared to the gross adjustments provided by a mounting sleeve with grooves, for example.

Figure 30:
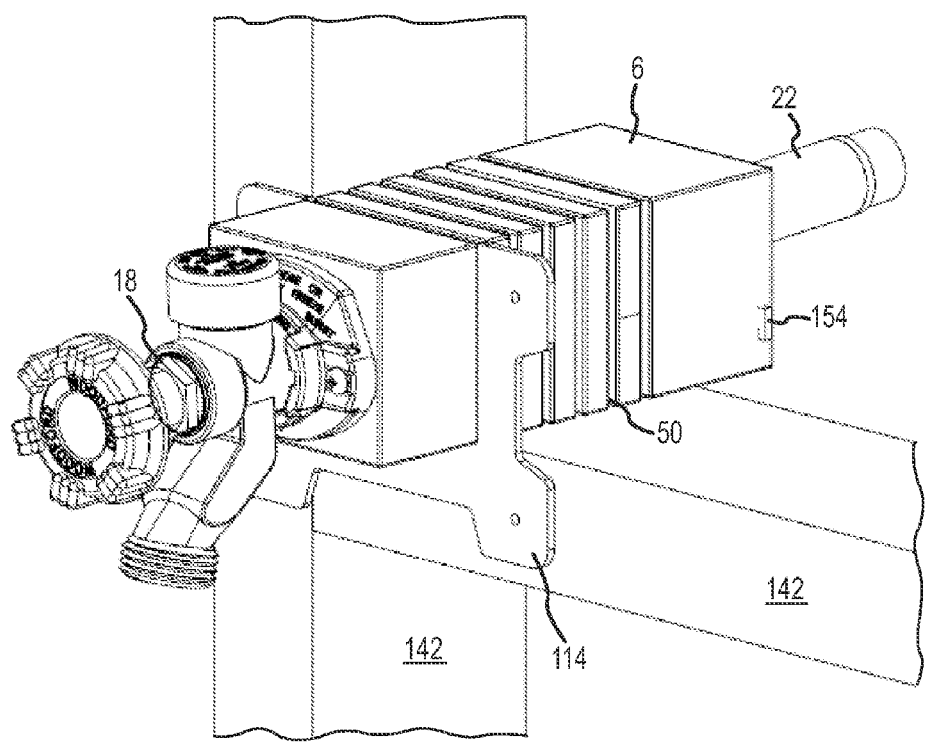
FIG. 30 is a perspective view of an alternate embodiment of the present invention wherein a generally rectangular mounting sleeve is employed.
Figure 31:
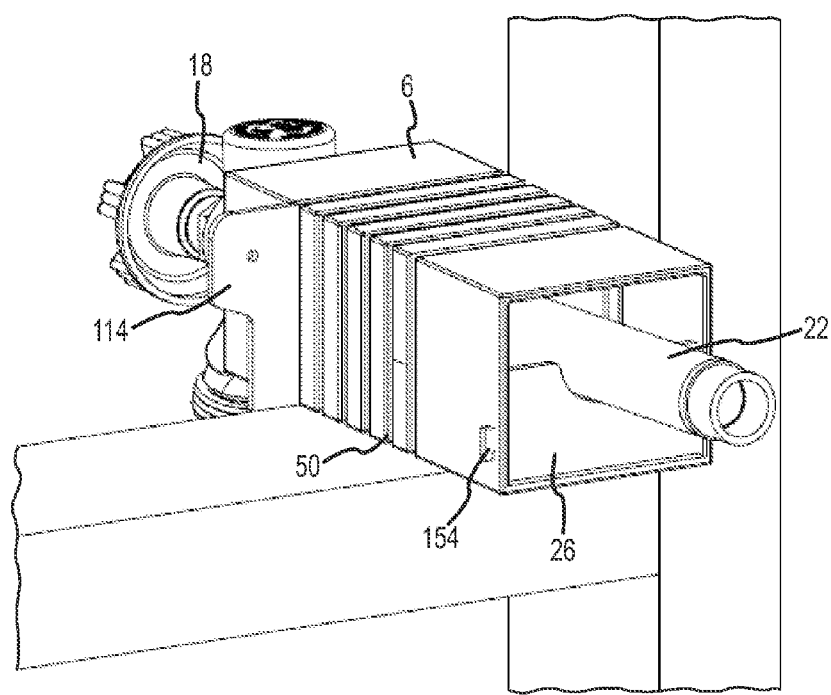
FIG. 31 is a rear perspective view of the embodiment of the present invention shown in FIG. 30.
Figure 32:
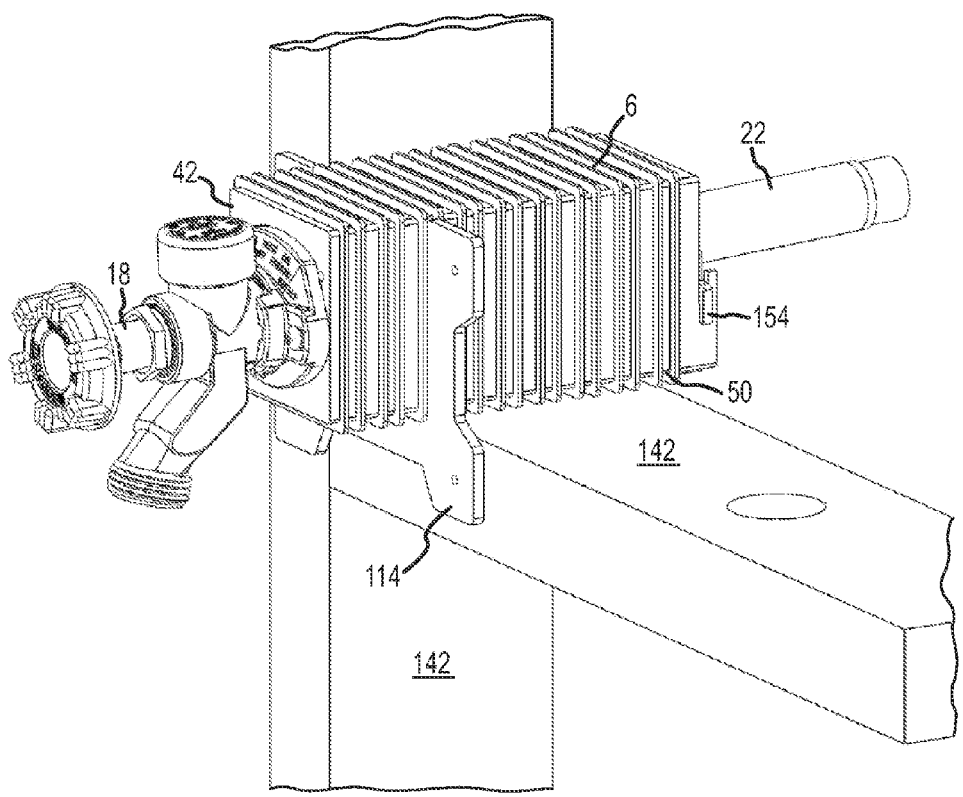
FIG. 32 is a perspective view of an alternate embodiment of the faucet mounting assembly similar to that shown in FIG. 30.

Referring now to FIGS. 30-32, a mounting sleeve 6 having a generally rectangular or square cross section is provided.

Here, the mounting sleeve 6 also includes a plurality of grooves 50 that interface with a bracket 114 to secure the mounting sleeves relative thereto. The tube rests 26 of these embodiments of the present invention may include hooks 154 that engage with the outer surface of the mounting sleeve 6. The rectangular mounting sleeve is shown associated with a horizontal/vertical studs 142 of a building wherein the bracket 114 is nailed directly to at least one stud 142. The shape of the mounting sleeve 6 also provides additional stability such that its engagement with the vertical/horizontal studs 142 prevents rotation of the mounting sleeve 6.

Figure 33:
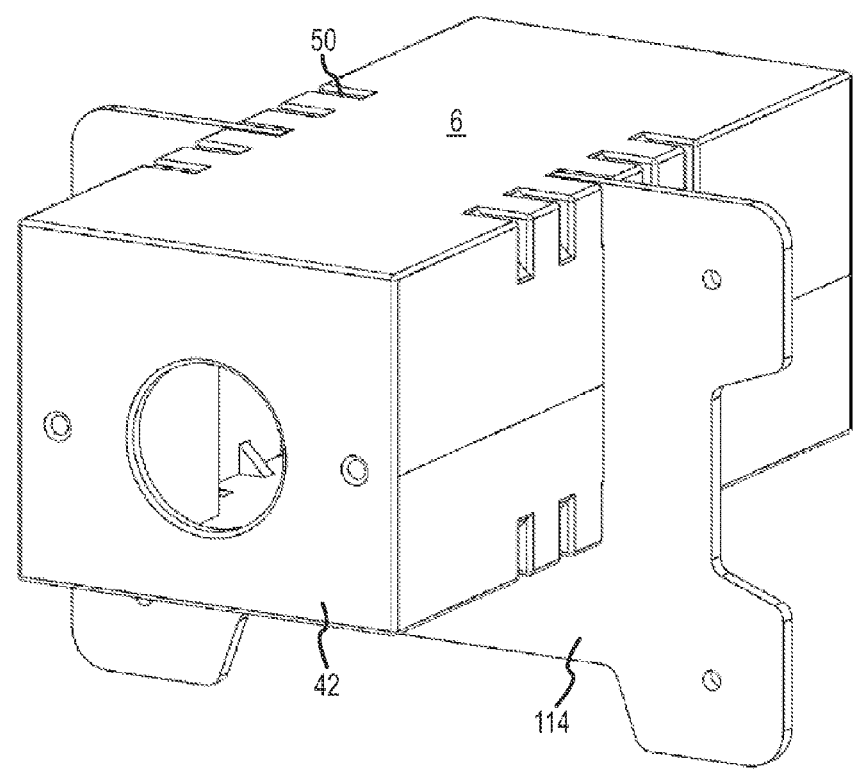
FIG. 33 is a perspective view of an alternate embodiment of the faucet mounting assembly similar that shown in FIG. 30.

Referring now to FIG. 33, yet another embodiment of the present invention is shown that employs a square mounting sleeve 6. Here, the grooves 50 are non-continuous and interface with the bracket 114. In the embodiments shown, the bracket 114 snap fits into grooves 50 to secure the mounting sleeve 6. The bracket 114 employs a plurality of apertures for the receipt of nails or wood screws to interconnect to the studs of a building, for example.

Referring now to FIGS. 1-23, the mounting sleeve 6 of one embodiment of the present invention is interconnected to a dwelling, or other structure, in the following manner. Initially, faucet location are identified from inside the dwelling and a level line is drawn. A 2%16 inch hole is drilled such that its center coincides with the level line previously drawn. The bottom bracket 10 is then aligned to the hole such that the mounting sleeve rest 78 coincides with the bottom lip of the hole. Alignment marks 94 on the bottom bracket 10 are also aligned with the previously drawn level line. Once all is in alignment, fasteners 34 are used to interconnect the bottom bracket 10 to the well 30 of the dwelling. The mounting sleeve 6 is then inserted through the hole and maintained on the bottom bracket 10. Next, the approximate offset needed to compensate for the exterior surface 38 is estimated and the offset is noted from the offset indicator 62 provided on the mounting sleeve 6. Preferably, the mounting sleeve 6 should be near flush with the exterior finished surface 38. Once the desired offset is maintained, the top bracket 14 is slid onto the bottom bracket 10 wherein the bottom bracket 10 is also positioned within a groove 50 of the mounting sleeve 6 to hold the mounting sleeve 6 in place. At least one fastener 34 is then used to secure the top bracket 14 to the wall 30. Next, a finishing material or veneer 32 is added around the mounting sleeve 6, thereby blending it in with the exterior surface 38. Finally, the faucet assembly is then interconnected to the mounting sleeve 6 wherein the faucet flange 46 is fastened with screws to the mounting sleeve 6. This installation step also positions the tube 22 on the tube rest 26 to ensure a proper drain angle $\alpha$ of about 3 degrees. The final step is to interconnect the water supply to the tube 22.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. In addition, one skilled in the art will appreciate that aspects of other inventions may be incorporated and are added in combination to the embodiments of the present invention disclosed herein. For example, aspects of the inventions disclosed in, for example, U.S. Pat. Nos. 6,142,172 and 6,431,204, both of which being incorporated by reference herein, which concern wall faucets, may be incorporated into embodiments of the present invention.

What is claimed is:

1. A faucet mounting assembly adapted to secure a faucet assembly, comprising:
 a bottom bracket having an arcuate surface that is adapted to interconnect to an interior structure of a dwelling;
 a cylindrical mounting sleeve having a first end, a second end, a top portion with a plurality of spaced grooves that are defined by equally-spaced and parallel ridges, and a smooth bottom surface, said first end having a flange that is adapted to receive and secure a faucet flange, said mounting sleeve being selectively engaged onto said arcuate surface of said bottom bracket wherein said mounting sleeve is capable of moving relative thereto to alter the distance between said flange and said bottom bracket; and
 a top bracket selectively interconnected to said bottom bracket wherein said mounting sleeve is positioned therebetween, said top bracket being positioned within one of said plurality of spaced grooves to substantially fill the same such that said mounting sleeve is secured relative to said bottom bracket and said top bracket such that substantial movement of said mounting sleeve in a direction parallel to its longitudinal axis is prevented.

2. The assembly of claim 1, wherein said flange of said mounting sleeve possesses a profile that matches a profile of the faucet flange, thereby substantially ensuring that the faucet assembly is correctly oriented.

3. The assembly of claim 1, further comprising a tube rest interconnected to the mounting sleeve that is adapted to receive a fluid delivery tube of the faucet assembly.

4. The faucet mounting assembly of claim 1, wherein said bottom surface only spans about half of an outer surface of said mounting sleeve.

5. The faucet mounting assembly of claim 1, wherein said bottom surface is smooth from said first end of said mounting sleeve to said second end of said mounting sleeve.

6. The faucet mounting assembly of claim 1, wherein at least a portion of said bottom surface is devoid of grooves.

7. A faucet mounting assembly adapted to secure a faucet assembly, comprising:
 a bottom bracket adapted for interconnection to a dwelling;
 a mounting sleeve associated with said bottom bracket, said mounting sleeve having a first end, a second end, a top portion with a plurality of spaced grooves that are defined by equally-spaced and parallel ridges, and a smooth bottom surface, said mounting sleeve including a flange that is adapted to provide an interconnection location for a faucet flange provided on the faucet assembly;
 a top bracket selectively interconnected to said bottom bracket with said mounting sleeve positioned therebetween, said top bracket being positioned within one of said plurality of spaced grooves.

8. The assembly of claim 7, wherein said mounting sleeve is cylindrical.

9. The assembly of claim 7, wherein said mounting sleeve includes a device for measuring.

10. The assembly of claim 7 wherein a first outer edge and a second outer edge of said top bracket each include a channel that selectively engages a tongue provided in a first portion and a second portion of said bottom bracket to secure said top bracket to said bottom bracket.

11. The assembly of claim 7, further comprising a tube rest interconnected to the mounting sleeve that is adapted to receive a fluid delivery tube of the faucet assembly.

12. A faucet mounting assembly adapted to secure a faucet assembly, comprising:
 a first means for securing adapted for interconnection to a dwelling;

a means for mounting associated with said first means for securing, said means for mounting having an end face positioned on one end thereof that is adapted to secure a flange of a faucet assembly and a second open end, said end face and said second open end being spaced by a sleeve portion that is adapted to accommodate a fluid delivery line of the faucet assembly, said means for mounting also possessing a top portion with a plurality of spaced grooves that are defined by equally-spaced and parallel ridges, and a smooth bottom surface;

a second means for securing capable of selective interconnection to said first means for securing with said means for mounting positioned between said first means for securing and said second means for securing wherein said first means for securing is positioned within one of said plurality of grooves; and a tube rest associated with said second open end that is adapted to receive a fluid delivery tube of the faucet assembly.

13. The assembly of claim 12, wherein said means for mounting possesses at least one of a generally circular cross-section, a generally square cross-section, a generally rectangular cross-section, a generally hexagonal cross-section, a generally octagonal cross-section, and a generally triangular cross-section.

14. The assembly of claim 12, wherein said means for mounting includes a means for engaging that selectively interfaces with said second means for securing.

15. The assembly of claim 12, wherein said means for mounting includes a means for measuring.

16. A fluid delivery system interconnected to a structure, comprising:

faucet assembly that includes a faucet with an associated a faucet flange and a fluid delivery tube in communication with said faucet;

a mounting sleeve having a first end interconnected to said faucet flange and a second end that receives said tube, said mounting sleeve also including a plurality of spaced grooves that are defined by equally-spaced and parallel ridges, and a smooth bottom surface;

a bottom bracket interconnected to an interior surface of the structure; and a top bracket selectively interconnected to said bottom bracket with said mounting sleeve positioned therebetween wherein said top bracket is positioned within and substantially filling one groove of the plurality thereof.

17. The assembly of claim 16, wherein said mounting sleeve is cylindrical.

18. The assembly of claim 16, wherein said mounting sleeve includes a device for measuring.

19. The assembly of claim 16, wherein said mounting sleeve includes a flange that is adapted to provide an interconnection location for the faucet flange provided on the faucet assembly.

20. The assembly of claim 16 wherein said top bracket includes a channel that selectively engages a tongue provided in said bottom bracket to secure said top bracket to said bottom bracket.

21. The assembly of claim 16, further comprising a tube rest interconnected to the mounting sleeve that is adapted to receive the fluid delivery tube of the faucet assembly.

* * * * *